US012769145B2

(12) United States Patent
Akimoto

(10) Patent No.: US 12,769,145 B2
(45) **Date of Patent: *Oct. 20, 2026**

(54) IMAGE DISPLAY DEVICE

(71) Applicant: NICHIA CORPORATION, Anan (JP)

(72) Inventor: Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 239 days.

This patent is subject to a terminal disclaimer.

(21) Appl. No.: 18/741,019

(22) Filed: Jun. 12, 2024

(65) Prior Publication Data

US 2024/0329425 A1 Oct. 3, 2024

Related U.S. Application Data

(63) Continuation of application No. PCT/JP2022/040909, filed on Nov. 1, 2022.

(30) Foreign Application Priority Data

Dec. 17, 2021 (JP) ................................ 2021-205023

(51) Int. Cl.
*G02B 5/124* (2006.01)
*G02B 30/56* (2020.01)

(52) U.S. Cl.
CPC ............ *G02B 30/56* (2020.01); *G02B 5/124* (2013.01)

(58) Field of Classification Search
CPC ................................ G02B 30/56; G02B 5/124
USPC ........................................ 359/529, 530, 534
See application file for complete search history.

(56) References Cited

U.S. PATENT DOCUMENTS 4,303,305 A * 12/1981 Jones ..................... G02B 5/122 359/534
11,892,572 B1 2/2024 Dunphy et al.
12,025,798 B1 7/2024 Dehkordi et al.
12,498,586 B2 * 12/2025 Akimoto ................ G02B 30/56
12,560,823 B2 * 2/2026 Akimoto ................ G02B 30/56
12,578,590 B2 * 3/2026 Akimoto .............. G02B 17/006
2010/0110384 A1 5/2010 Maekawa
(Continued)

FOREIGN PATENT DOCUMENTS

JP 2009-042337 A 2/2009
JP 2013-238681 A 11/2013
(Continued)

OTHER PUBLICATIONS

Non-Final Office Action in U.S. Appl. No. 18/390,715 dated May 30, 2025.
(Continued)

*Primary Examiner* — Audrey Y Chang
(74) *Attorney, Agent, or Firm* — Foley & Lardner LLP

(57) ABSTRACT

An image display device includes an image-forming element and a light source. The image-forming element includes a base member including a first surface, and a reflector array on the base member. The reflector array includes multiple reflector rows, each including multiple dihedral orthogonal reflectors along a first direction. Each of the multiple dihedral orthogonal reflectors includes a first reflecting surface reflecting light from the first surface side, and a second reflecting surface that is orthogonal to the first reflecting surface and reflects a reflected light from the first reflecting surface toward the first surface side.

13 Claims, 28 Drawing Sheets

(56) References Cited

U.S. PATENT DOCUMENTS

| | | | | |
|---|---|---|---|---|
| 2010/0214394 | A1* | 8/2010 | Maekawa | G02B 30/56 348/51 |
| 2011/0074657 | A1 | 3/2011 | Sugiyama | |
| 2011/0235201 | A1 | 9/2011 | Maekawa | |
| 2015/0279283 | A1 | 10/2015 | Nakao | |
| 2018/0081058 | A1 | 3/2018 | Kalscheur | |
| 2018/0101087 | A1 | 4/2018 | Shinohara | |
| 2018/0164596 | A1 | 6/2018 | Houzyou et al. | |
| 2018/0203244 | A1 | 7/2018 | Hatanaka et al. | |
| 2018/0267216 | A1 | 9/2018 | Otsubo | |
| 2019/0179160 | A1* | 6/2019 | Ito | G02B 26/0816 |
| 2019/0196020 | A1 | 6/2019 | Aceti et al. | |
| 2020/0290513 | A1 | 9/2020 | Karafin et al. | |
| 2021/0096393 | A1 | 4/2021 | Daiku | |
| 2021/0103161 | A1 | 4/2021 | Daiku | |
| 2021/0379993 | A1 | 12/2021 | Xu et al. | |
| 2022/0043277 | A1 | 2/2022 | Karafin et al. | |
| 2022/0155614 | A1 | 5/2022 | Kikuta | |
| 2022/0176869 | A1 | 6/2022 | Maruyama | |
| 2023/0035023 | A1 | 2/2023 | Kikuta | |
| 2023/0074490 | A1 | 3/2023 | Keum et al. | |
| 2023/0128022 | A1 | 4/2023 | Weindorf et al. | |
| 2024/0036353 | A1 | 2/2024 | Krauthamer et al. | |
| 2024/0125985 | A1* | 4/2024 | Akimoto | G02B 5/124 |
| 2024/0142799 | A1* | 5/2024 | Akimoto | G02B 30/56 |
| 2024/0160036 | A1* | 5/2024 | Akimoto | G02B 27/0093 |
| 2024/0184109 | A1 | 6/2024 | Kitahara et al. | |
| 2024/0201425 | A1* | 6/2024 | Akimoto | G02B 30/56 |
| 2024/0210683 | A1 | 6/2024 | Aruga et al. | |
| 2024/0210684 | A1 | 6/2024 | Kitahara et al. | |
| 2024/0253465 | A1 | 8/2024 | Shintani et al. | |
| 2024/0355241 | A1 | 10/2024 | Kawanishi et al. | |
| 2024/0361611 | A1 | 10/2024 | Daiku | |
| 2024/0427169 | A1 | 12/2024 | Daiku | |

FOREIGN PATENT DOCUMENTS

| | | | |
|---|---|---|---|
| JP | 2015-146009 | A | 8/2015 |
| JP | 2017-156466 | A | 9/2017 |
| JP | 2017-156467 | A | 9/2017 |
| JP | 2017-156468 | A | 9/2017 |
| WO | WO-2016/199902 | A1 | 12/2016 |
| WO | WO-2017/018204 | A1 | 2/2017 |
| WO | WO-2017/051598 | A1 | 3/2017 |
| WO | WO-2017/146172 | A1 | 8/2017 |

OTHER PUBLICATIONS

Non-Final Office Action in U.S. Appl. No. 18/508,974 dated Jan. 27, 2026.

Non-Final Office Action on U.S. Appl. No. 18/504,237 dated Dec. 16, 2025.

U.S. Appl. No. 18/390,715, filed Dec. 20, 2023, Akimoto et al.

U.S. Appl. No. 18/392,314, filed Dec. 21, 2023, Hajime Akimoto.

U.S. Appl. No. 18/493,167, filed Oct. 24, 2023, Akimoto et al.

U.S. Appl. No. 18/504,237, filed Nov. 8, 2023, Akimoto et al.

U.S. Appl. No. 18/508,974, filed Nov. 14, 2023, Akimoto et al.

U.S. Appl. No. 18/520,041, filed Nov. 27, 2023, Akimoto et al.

U.S. Appl. No. 18/526,318, filed Dec. 1, 2023, Akimoto et al.

International Search Report and Written Opinion of the International Searching Authority with English language translations issued in the corresponding International Patent Application No. PCT/JP2022/012835, dated May 17, 2022.

International Search Report and Written Opinion of the International Searching Authority with English language translations issued in the corresponding International Patent Application No. PCT/JP2022/040909, dated Dec. 20, 2022.

U.S. Appl. No. 18/741,019, filed Jun. 12, 2024, Hajime Akimoto.

Notice of Allowance on U.S. Appl. No. 18/520,041 dated Apr. 9, 2025.

Notice of Allowance in U.S. Appl. No. 18/392,314 dated Mar. 13, 2026.

* cited by examiner

IMAGE DISPLAY DEVICE

CROSS-REFERENCE TO RELATED APPLICATIONS

The present application is a bypass continuation of PCT Application No. PCT/JP2022/040909, filed Nov. 1, 2022, which claims priority to Japanese Application No. 2021-205023, filed Dec. 17, 2021. The contents of these applications are hereby incorporated by reference in their entireties.

BACKGROUND

Embodiments of the invention relate to an image display device.

A reflective image-forming optical element that displays a real image of an object to be observed in mid-air and an image display device in which the reflective image-forming optical element is applied have been proposed (see, e.g., JP 2015-146009A).

Such an image display device can display an image when needed by a user, and not display the image at other times. In addition, because the image is displayed in mid-air, a device for the display part is unnecessary, therefore providing advantages such as more effective utilization of the limited space inside an automobile or the like.

Also, applications of technology capable of displaying images in mid-air are expected to realize non-contact operation panels as a precaution against infectious diseases, thereby expanding the field of application beyond utilization in automobiles and the like.

Such reflective image-forming optical elements that have been put into practical use include those that use dihedral orthogonal reflectors and those that use retroreflective function optical elements called corner cube reflectors (see, e.g., WO 2016/199902-A). Attention has been called to problems resulting from the operation principles of each. For example, in an image display device that uses an image-forming element using dihedral orthogonal reflectors, it is said to be difficult to avoid the display of false images at locations unintended by the user.

In an image display device using a corner cube reflector, the formation position of the floating image can be set relatively freely by using an optical element. On the other hand, the configuration of such an optical element is complex.

Therefore, an image display device having a simple structure that can display an image in mid-air is desirable.

SUMMARY

An embodiment of the invention provides an image display device having a simple structure that can display an image in mid-air.

Means for Solving the Problem

An image display device according to an embodiment of the invention includes an image-forming element, and a light source irradiating light on the image-forming element. The image-forming element includes a base member including a first surface and a second surface positioned at a side opposite to the first surface, and a reflector array located on the base member. The reflector array includes multiple reflector rows including multiple dihedral orthogonal reflectors arranged along a first direction. The multiple dihedral corner reflectors each include a first reflecting surface configured to reflect light from the first surface side, and a second reflecting surface that is orthogonal to the first reflecting surface and configured to reflect a reflected light from the first reflecting surface toward the first surface side. In each of the multiple reflector rows, an angle between a straight line and a virtual plane is set to a value greater than 0° and less than 90°; the first reflecting surface and the second reflecting surface cross at the straight line; and the virtual plane includes the first direction, and a second direction crossing the first direction. An angle between the first reflecting surface and the virtual plane is set to a value greater than 45° and less than 90°. The multiple reflector rows include a first reflector row of which the angle between the straight line and the virtual plane is set to a smallest value among the multiple reflector rows. The angle between the straight line and the virtual plane is set to values that increase away from the first reflector row in the second direction for remaining reflector rows among the multiple reflector rows. The light source is located at the first surface side. Each of the multiple dihedral corner reflectors is arranged so that a portion of once-reflected light travels toward the second reflecting surface; and the once-reflected light is emitted from the light source and reflected by the first reflecting surface.

DETAILED DESCRIPTION

Figure 1:
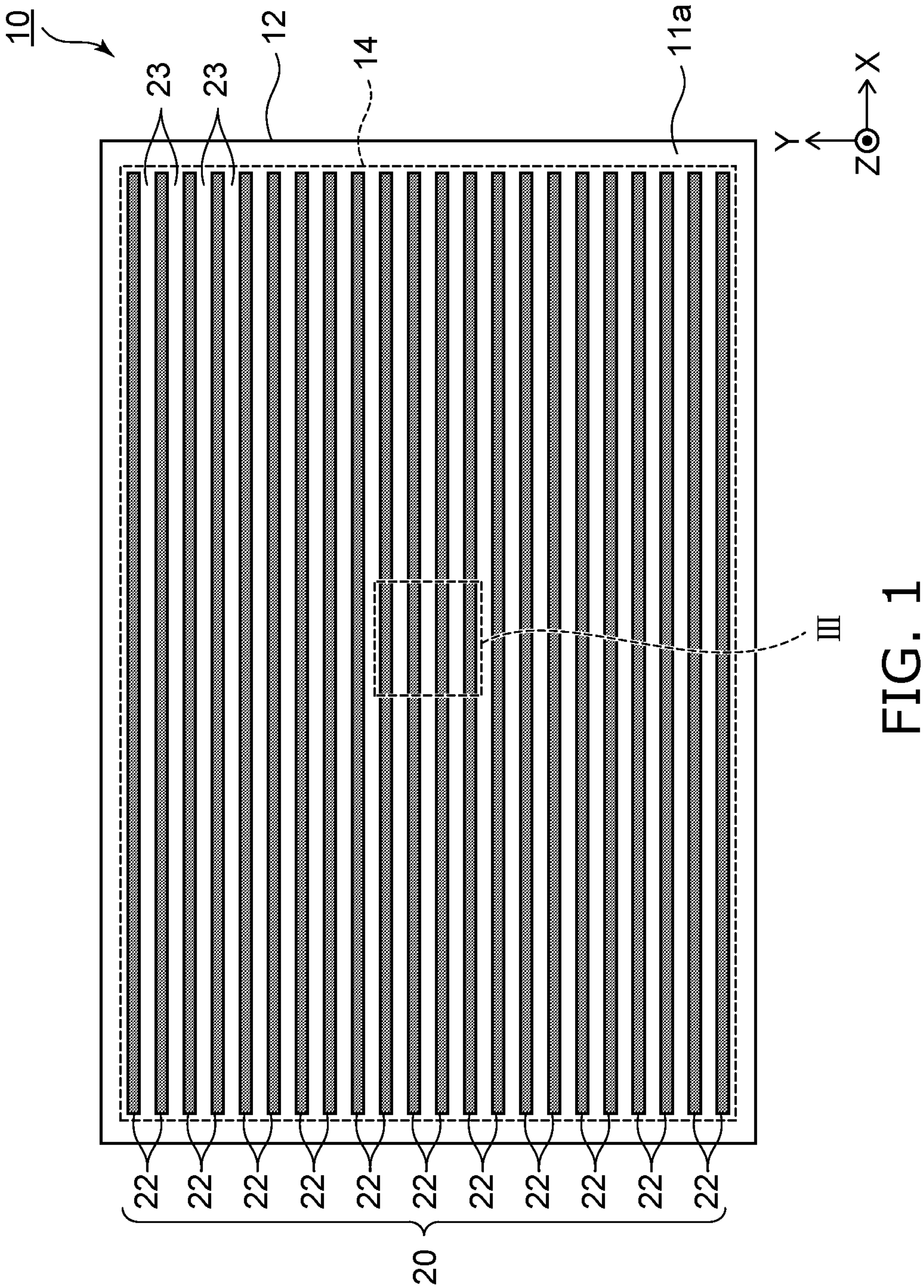
FIG. 1 is a schematic plan view illustrating an image-forming element according to a first embodiment.

Embodiments of the invention will now be described with reference to the drawings.

The drawings are schematic or conceptual, and the relationships between the thickness and width of portions, the proportions of sizes among portions, etc., are not necessarily the same as the actual values. Also, the dimensions and proportions may be illustrated differently among drawings, even when the same portion is illustrated.

In the specification and drawings, components similar to those described previously or illustrated in a previous drawing are marked with the same reference numerals, and a detailed description is omitted as appropriate.

First Embodiment

FIG. 1 is a schematic plan view illustrating an image-forming element according to the embodiment.

As shown in FIG. 1, the image-forming element 10 according to the embodiment includes a base member 12 and a reflector array 20. The base member 12 includes a first surface 11*a*, and the reflector array 20 is located on the first surface 11*a*. In the example, the reflector array 20 is located in a reflector formation region 14 of the first surface 11*a*. The reflector array 20 includes multiple reflector rows 22.

First, a configuration of the base member 12 will be described.

Figure 2:
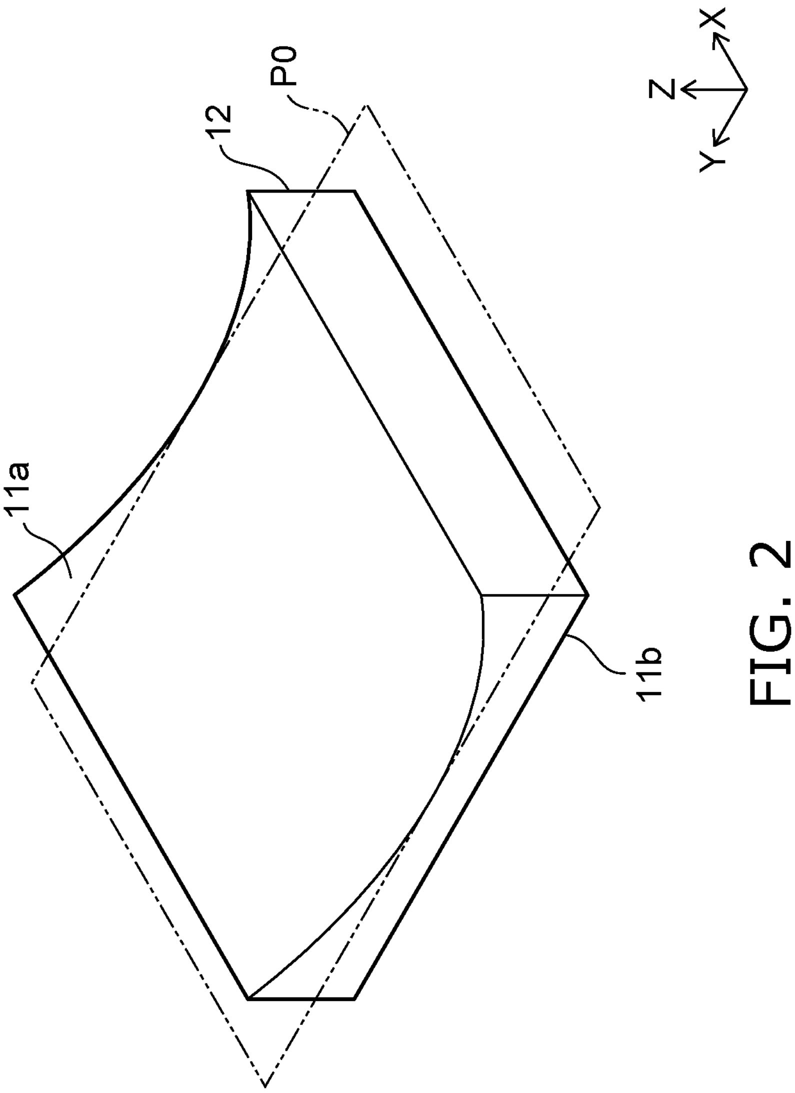
FIG. 2 is a schematic perspective view illustrating a portion of the image-forming element of the first embodiment.

FIG. 2 is a schematic perspective view illustrating a portion of the image-forming element of the embodiment.

As shown in FIG. 2, the base member 12 includes the first surface 11*a* and a second surface 11*b*. The second surface 11*b* is located at the side opposite to the first surface 11*a*.

In the specification, the configurations of the image-forming element, the image display device, etc., may be described using an XYZ right-handed three-dimensional coordinate system. The XY-plane is defined as a plane parallel to a virtual plane P0. The first surface 11*a* is located further toward the positive Z-axis side than the second surface 11*b*. The first surface 11*a* includes a portion of a circular arc that is convex toward the negative Z-axis side when projected onto the YZ-plane. In specific examples described below, the virtual plane P0 is a virtual plane parallel to a tangent plane contacting the portion of the circular arc at a point positioned furthest toward the negative Z-axis side.

The first surface 11*a* is such a curved surface, and the reflector array 20 is located on the curved surface. The virtual plane P0 is used as a reference plane when setting the Y-axis direction tilt of the reflector row 22. In other words, the reflector row 22 is arranged on the first surface 11*a* at an angle set with respect to the virtual plane P0.

The base member 12 is formed of a light-transmitting material and is formed of, for example, a transparent resin.

In the image-forming element 10 of the embodiment, when the light source is located at the first surface 11*a* side when referenced to the base member 12, a floating image is formed not at the second surface 11*b* side, but at the first surface 11*a* side at which the light source is located. The position at which the floating image is formed can be a position that is different from the position at which the light source is located and sufficiently separated from the position at which the light source is located.

The description continues now by returning to FIG. 1.

The reflector row 22 extends along the X-axis direction. The multiple reflector rows 22 are arranged to be substantially parallel to each other along the Y-axis direction. The multiple reflector rows 22 are arranged at substantially uniform spacing in the Y-axis direction with a spacing 23 interposed respectively between the adjacent reflector rows 22. The Y-axis direction length of the spacing 23 of the reflector rows 22 can be any length and can be, for example, about the Y-axis direction length of the reflector row 22. When the light source is located at the first surface 11*a* side, light rays that are not reflected by the reflector row 22, reflected light that is reflected only once by the reflector row 22, and the like are incident on the region in which the spacing 23 of the reflector rows 22 is formed. Such light rays and the like do not contribute to the floating image; therefore, the ratio of the light rays incident on the image-forming element 10 that contribute to the floating image decreases as the spacing 23 increases. Therefore, the Y-axis direction length of the spacing 23 is set to an appropriate length according to the efficiency of the reflecting surfaces, the dimensions of the dihedral corner reflector described below with reference to FIG. 3A, etc. Each of the reflector rows 22 includes many dihedral corner reflectors connected in the X-axis direction, and is therefore shown as being filled-in to avoid complexity in FIG. 1.

Figure 3A:
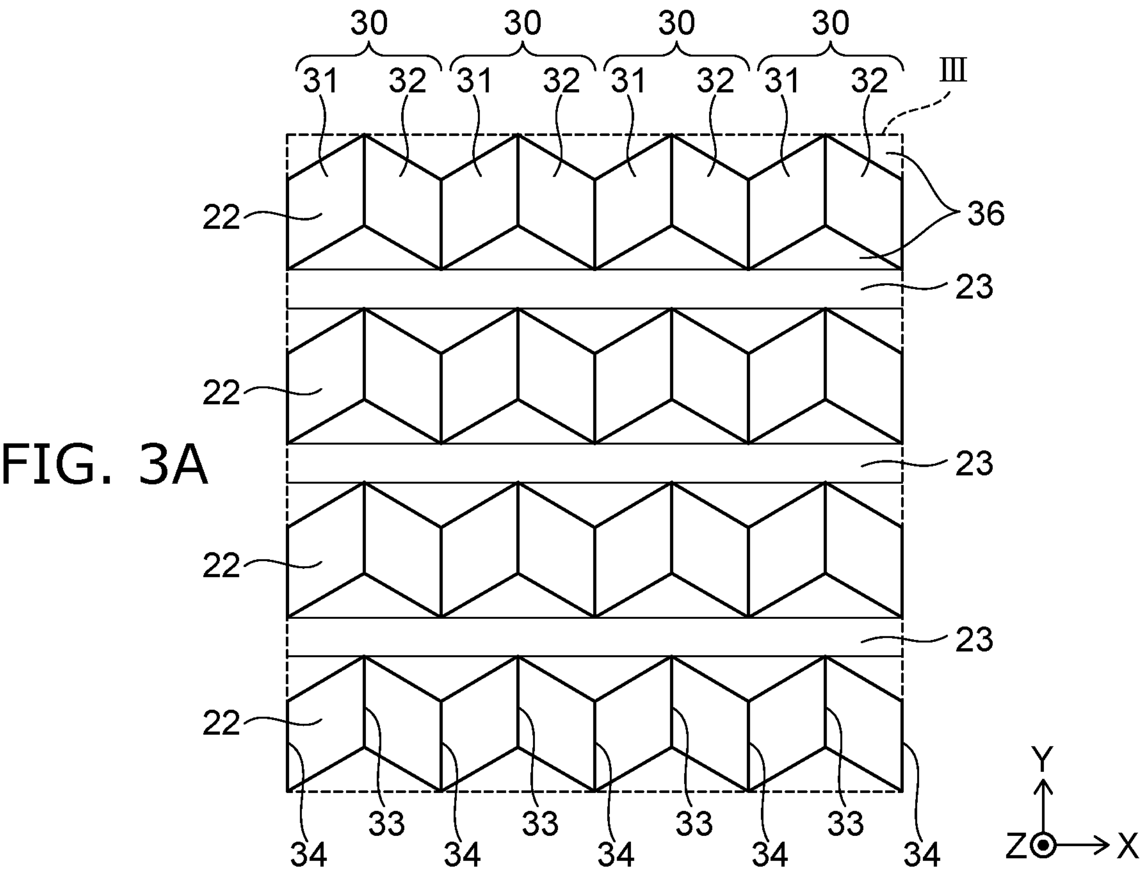
FIG. 3A is an enlarged schematic view of portion III of FIG. 1.

FIG. 3A is an enlarged schematic view of portion III of FIG. 1.

As shown in FIG. 3A, the reflector row 22 includes multiple dihedral corner reflectors 30. The multiple dihedral corner reflectors 30 are connected to each other along the X-axis direction, and are provided continuously. The dihedral corner reflector 30 includes a first reflecting surface 31 and a second reflecting surface 32. The dihedral corner reflector 30 is located on a base part 36 formed on the first surface 11*a* shown in FIG. 1. The first reflecting surface 31 and the second reflecting surface 32 each are substantially square when viewed in front-view, and are connected to be substantially orthogonal at one side of each square.

Hereinbelow, the connecting line of the first and second reflecting surfaces 31 and 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X-axis side. The second reflecting surface 32 of the dihedral corner reflector 30 is connected at the hill-side connecting line 34 to the first reflecting surface 31 of another dihedral corner reflector 30 adjacent at the positive X-axis side. Thus, the multiple dihedral corner reflectors 30 are connected to each other along the X-axis direction, and are provided continuously.

In the image-forming element 10 of the embodiment, the dimensions of the first and second reflecting surfaces 31 and 32 can be, for example, several μm to several 100 μm. For example, the number of integrated dihedral corner reflectors 30 is set according to the size, resolution, and the like of the mid-air image to be displayed. For example, several tens to several thousand dihedral corner reflectors 30 are integrated in one image-forming element 10. For example, one thousand dihedral corner reflectors including 100 μm-square reflecting surfaces can be arranged over about 14 cm in the Y-axis direction.

As in the enlarged view shown in FIG. 3A, the reflector rows 22 of the image-forming element 10 are arranged so that the X-axis direction positions of the valley-side connecting line 33 and the hill-side connecting line 34 are the same. This is not limited thereto; the X-axis direction positions of the valley-side connecting line 33 and the hill-side connecting line 34 may be shifted for each reflector row 22.

Figure 3B:
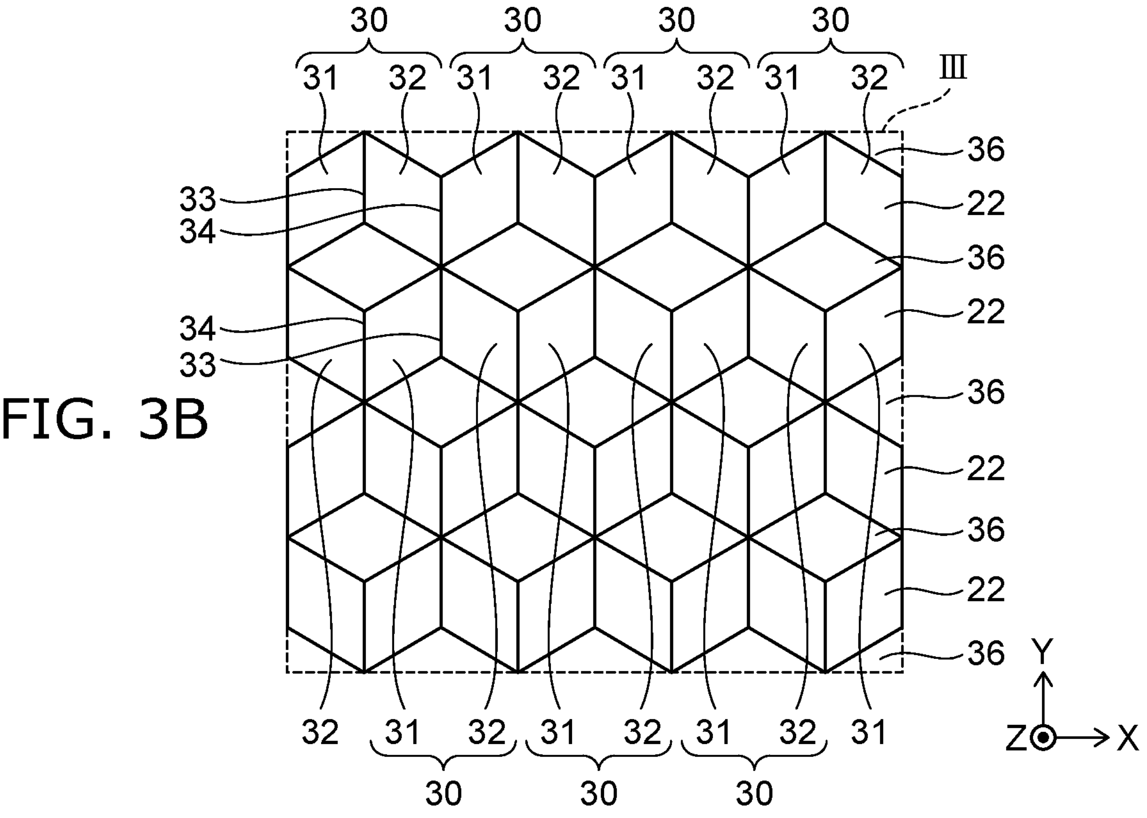
FIG. 3B is an enlarged schematic view of another example of portion III of FIG. 1.

FIG. 3B is an enlarged schematic view of another example of portion III of FIG. 1.

As shown in FIG. 3B, the X-axis direction positions of the valley-side connecting line 33 and the hill-side connecting line 34 are shifted for each adjacent reflector row 22. The shift amount of the reflector row 22 may be any value for each reflector row 22, or may be a constant value.

In the example shown in FIG. 3B, the X-axis direction shift amount of the positions of the valley-side connecting line 33 and the hill-side connecting line 34 is constant for each reflector row 22. The X-axis direction position of the valley-side connecting line 33 of the dihedral corner reflector 30 of one reflector row 22 of the example matches the X-axis direction position of the hill-side connecting line 34 of the dihedral corner reflector 30 of the reflector row 22 adjacent to the one reflector row 22. The X-axis direction position of the hill-side connecting line 34 of the dihedral corner reflector 30 of one reflector row 22 matches the X-axis direction position of the valley-side connecting line 33 of the dihedral corner reflector 30 of the reflector row 22 adjacent to the one reflector row 22. That is, the dihedral corner reflectors 30 of the adjacent reflector rows 22 are arranged with the phase shifted by ½ period, wherein one period is the distance between the valley-side connecting lines 33 or the distance between the hill-side connecting lines 34 of two adjacent dihedral corner reflectors 30.

In the example, the spacing 23 shown in FIG. 3A is not provided. The spacing 23 is zero. In such a case, the base part 36 may function as spacing. As described below in the operation description of the image-forming element 10, there are cases where it is necessary for once-reflected light to escape to the second surface side through the spacing 23 of the adjacent reflector rows 22 without the light rays incident on the dihedral corner reflector 30 being reflected a second time. Therefore, in the case of the example shown in FIG. 3B, the base part 36 is formed to transmit light or absorb light.

Figure 3C:
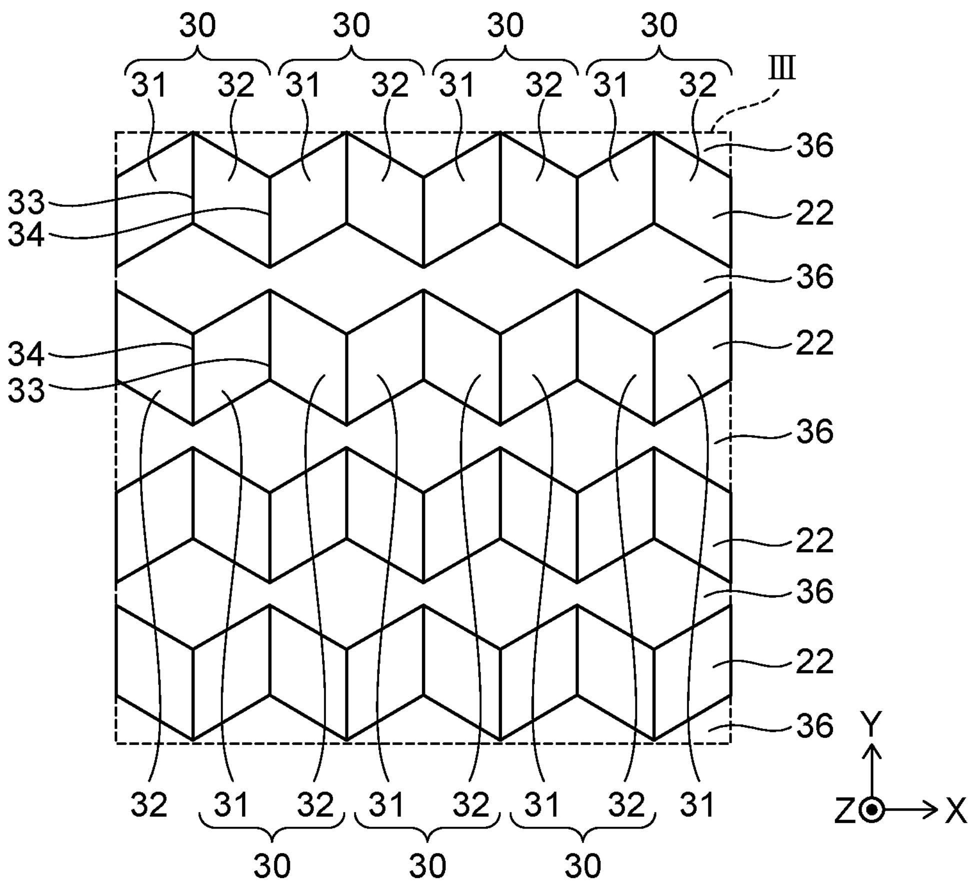
FIG. 3C is an enlarged schematic view of another example of portion III of FIG. 1.

FIG. 3C is an enlarged schematic view of another example of portion III of FIG. 1.

As shown in FIG. 3C, the region between the reflector rows 22 arranged in the Y-axis direction is not limited to the flat band-shaped spacing 23 shown in FIG. 3A, and the base part 36 may be arranged to be tilted with respect to the XY-plane. As described above, the phases of the valley-side connecting lines 33 and the hill-side connecting lines 34 of the adjacent reflector rows 22 are arbitrary.

When the image-forming elements shown in FIGS. 3B and 3C are used in image display devices 1000, 1100, and 1200 described below with reference to FIGS. 22 to 26, it is possible to make it difficult to observe a false image at the first surface side by making the base part 36 light-transmissive or light-absorbing as described above.

Figure 4A:
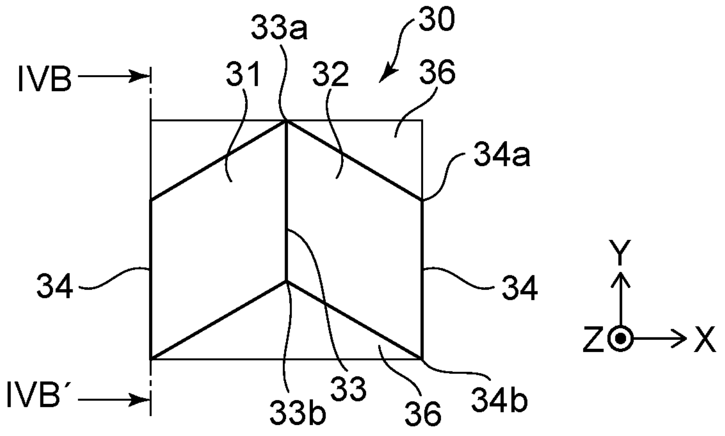
FIG. 4A is a schematic plan view illustrating a portion of the image-forming element of the first embodiment.

FIG. 4A is a schematic plan view illustrating a portion of the image-forming element of the embodiment.

Figure 4B:
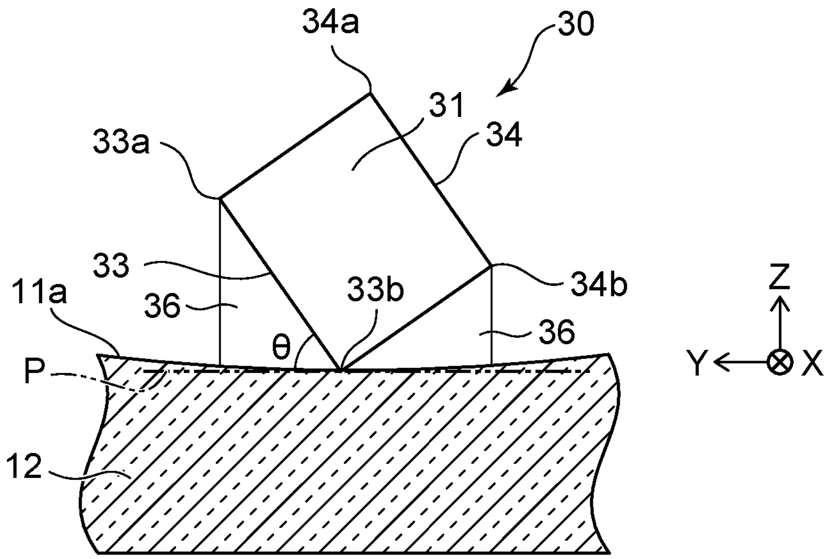
FIG. 4B is an example of a schematic auxiliary cross-sectional view along line IVB-IVB' of FIG. 4A.

FIG. 4B is an example of a schematic auxiliary cross-sectional view along line IVB-IVB' of FIG. 4A.

FIGS. 4A and 4B show a configuration of the dihedral corner reflector 30.

As shown in FIGS. 4A and 4B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11*a*. The base part 36 is a light-transmitting member formed in a V-shape, is formed of, for example, a transparent resin, and is formed as a continuous body with the base member 12. The first reflecting surface 31 and the second reflecting surface 32 are formed by thin film formation of a light-reflective metal material or the like at the formation location of the V-shape of the base member 12. The formation is not limited to such an example; each of or a portion of the first reflecting surface 31, the second reflecting surface 32, the base part 36, and the base member 12 may be formed separately, and assembled as one to form the image-forming element 10. Also, the surface of the transparent resin can be used as-is as the first and second reflecting surfaces 31 and 32 when, for example, mirror finishing or the like of the surface of the transparent resin is performed and the surface reflectance of the transparent resin is sufficiently high. To prevent the observation of a false image, etc., it is favorable for the spacing 23 and/or the base part 36 described with reference to FIG. 3B to be light-transmissive or light-absorbing.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33*a* and 33*b*. The position of the vertex 33*a* is further toward the positive Z-axis side than the position of the vertex 33*b*. That is, the vertex 33*a* is positioned to be more distant to the base member 12 than the vertex 33*b*. The end portions of the hill-side connecting line 34 are called vertices 34*a* and 34*b*. The position of the vertex 34*a* is further toward the positive Z-axis side than the position of the vertex 34*b*. That is, the vertex 34*a* is positioned to be more distant to the base member 12 than the vertex 34*b*. Accordingly, the vertex 34*a* is positioned to be furthest from the base member 12, and the vertex 33*b* is positioned to be most proximate to the base member 12.

FIG. 4B shows the relationship between the dihedral corner reflector 30, the first surface 11*a*, and the tangent plane P. The dihedral corner reflector 30 contacts the first surface 11*a* at the vertex 33*b* at the lower side of the valley-side connecting line 33. The tangent plane P is a plane that contacts the first surface 11*a* at the position of the vertex 33*b*, and is a plane that is parallel to the virtual plane P0. The dihedral corner reflector 30 is arranged on the first surface 11*a* so that the valley-side connecting line 33 forms an angle θ with the tangent plane P.

Figure 4C:
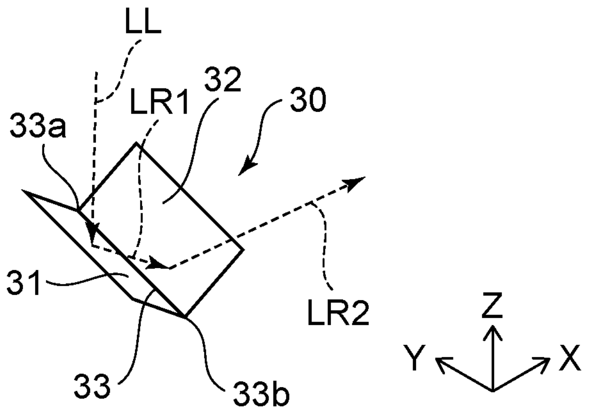
FIG. 4C is a schematic perspective view for describing an operation of the image-forming element of the first embodiment.

FIG. 4C is a schematic perspective view for describing an operation of the image-forming element of the embodiment.

As shown in FIG. 4C, when a light ray LL is incident on the first reflecting surface 31, the light ray LL is reflected by the first reflecting surface 31. A once-reflected light LR1 that is reflected by the first reflecting surface 31 is re-reflected by the second reflecting surface 32. A twice-reflected light LR2 that is reflected by the second reflecting surface 32 is emitted toward the same side as the light source of the incident light. Thus, the dihedral corner reflector 30 emits the incident light from the first surface 11*a* side toward a different position from the position of the light source at the first surface 11*a* side. Thus, the dihedral corner reflector 30 reflects the light twice by two reflecting surfaces, and reflects the twice-reflected light LR2 toward the side from which the incident light ray LL traveled.

Figure 4D:
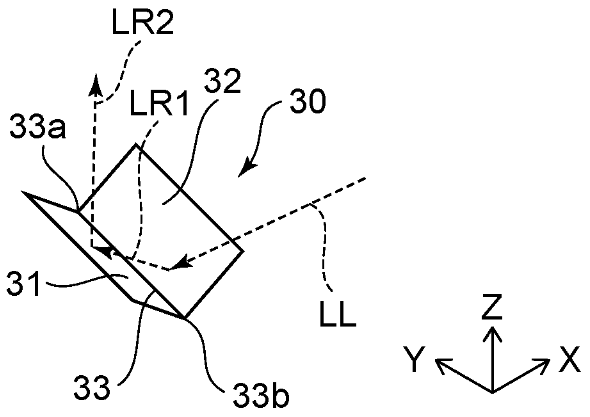
FIG. 4D is a schematic perspective view for describing an operation of the image-forming element of the first embodiment.

FIG. 4D is a schematic perspective view for describing an operation of the image-forming element of the embodiment.

The reflection operation of the dihedral corner reflector 30 is reversible. When the light ray incident on the dihedral corner reflector 30 in FIG. 4C is incident from the opposite direction along the twice-reflected light LR2, the light ray is reflected in the opposite direction along the incident light ray LL. Specifically, as shown in FIG. 4D, the light ray LL that is incident on the dihedral corner reflector 30 is reflected by the second reflecting surface 32 and incident on the first reflecting surface 31 as the once-reflected light LR1. The once-reflected light LR1 is reflected by the first reflecting surface 31 to be emitted as the twice-reflected light LR2.

As shown in FIGS. 3 and 4A, the dihedral corner reflector 30 is line-symmetric with respect to the valley-side connecting line 33, and is arranged so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 4C, the light ray LL is initially incident on the first reflecting surface 31 and reflected by the first reflecting surface 31; however, the operation of the dihedral corner reflector 30 can be similar to the description described above even when the light ray LL is initially incident on the second reflecting surface 32 and reflected by the second reflecting surface 32 as shown in FIG. 4D. Also, in FIG. 4D, the light ray LL may be initially incident on the first reflecting surface 31, and the once-reflected light from the first reflecting surface 31 may be reflected by the second reflecting surface 32 to be emitted as the second reflected light. Unless otherwise noted in the description of the operation of the image-forming element hereinbelow, the case where the light ray LL is initially reflected by the first reflecting surface 31 will be described.

Figure 5:
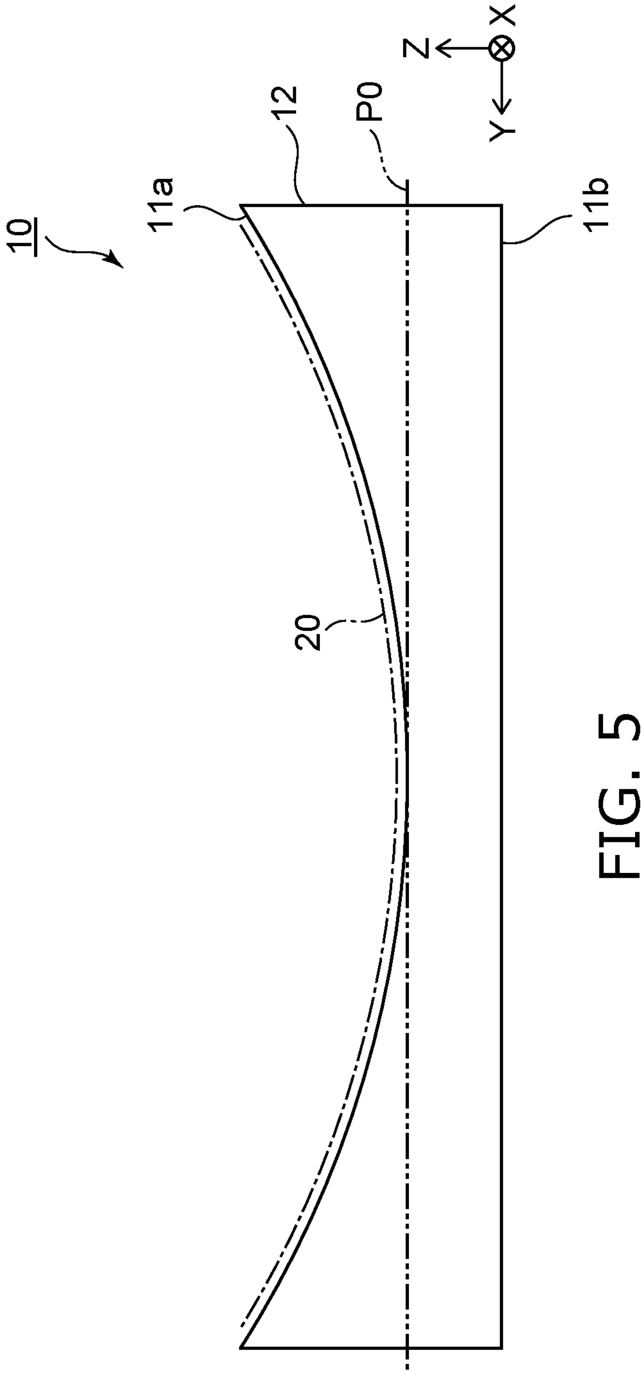
FIG. 5 is a schematic side view illustrating the image-forming element of the first embodiment.

FIG. 5 is a schematic side view illustrating the image-forming element of the embodiment.

In FIG. 5, the reflector array 20 is shown by an envelope connecting the vertices 33*a* of the dihedral corner reflectors 30 shown in FIGS. 4A and 4B. In side views described below, the reflector array 20 is illustrated by illustrating the envelope of the vertices 33*a* of the dihedral corner reflectors 30 as a single dot-dash line as shown in FIG. 5 unless it is necessary to show and describe the configuration of the dihedral corner reflector 30.

In the image-forming element 10 of the embodiment as shown in FIG. 5, the reflector array 20 is arranged in a curved shape because the first surface 11*a* is a curved surface. The first surface 11*a* includes a portion of a circular arc that is convex toward the negative Z-axis side when projected onto the YZ-plane; the reflector array 20 is also arranged in an arc-like shape, and the envelope of the vertices is also a circular arc. The radius of the circular arc is set based on the distance between the image-forming element 10 and the light source located at the first surface

11*a* side of the image-forming element 10. For example, the radius of the circular arc of the reflector array 20 is set to about 2 times the distance between the image-forming element 10 and the light source.

As described with reference to FIGS. 4C and 4D, the image-forming element 10 is reversible with respect to the directions of the incidence and reflection of the light ray. In the image-forming element 10, when the directions of the incidence and reflection are opposite, the radius of the circular arc is set based on the distance between the image-forming element 10 and the floating image formed at the first surface 11*a* side. As in the description above, the radius of the circular arc of the reflector array 20 is set to about 2 times the distance between the image-forming element 10 and the floating image.

According to the embodiment, the tangent plane that contacts the first surface 11*a* at the lowest position at the negative Z-axis direction side is the virtual plane P0 that is parallel to the XY-plane.

Figure 6:
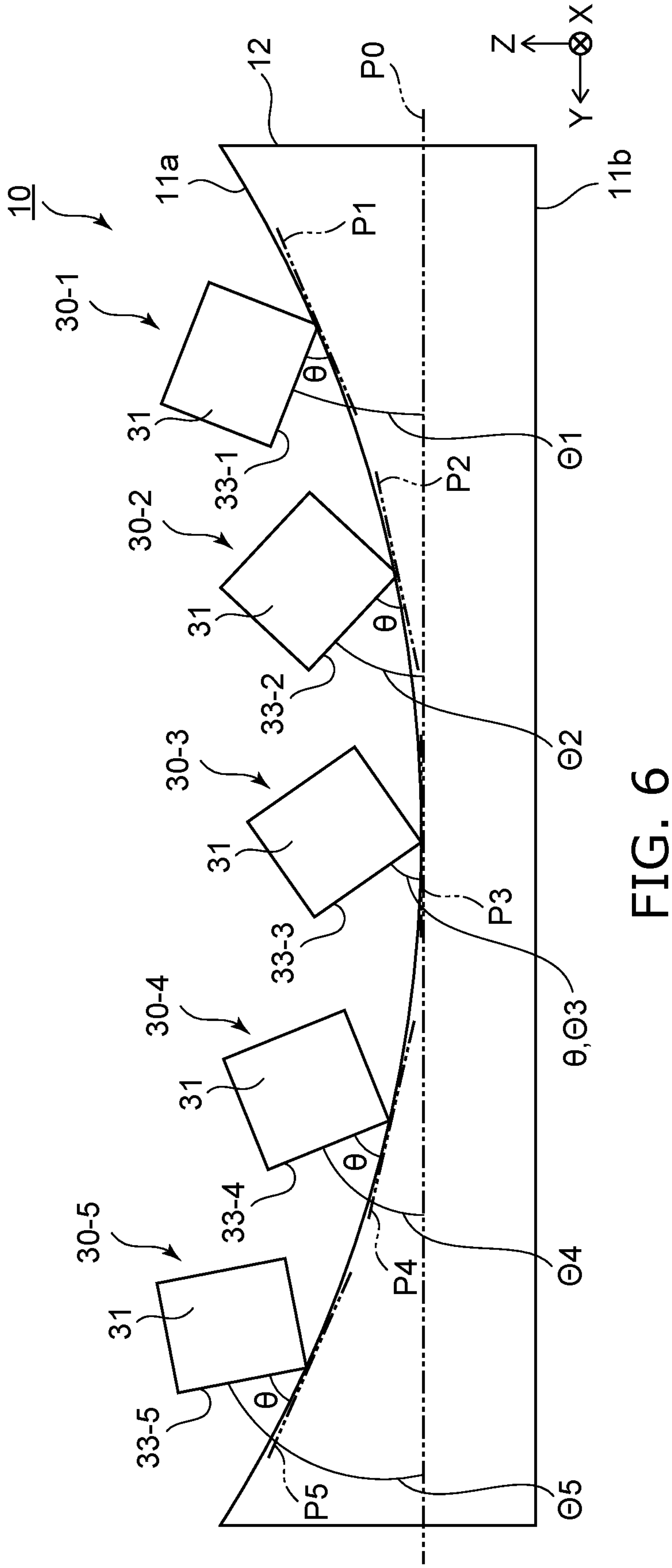
FIG. 6 is a schematic side view illustrating the image-forming element of the first embodiment.

FIG. 6 is a schematic side view illustrating the image-forming element of the embodiment.

FIG. 6 shows one dihedral corner reflector included in the reflector row 22 shown in FIGS. 1 and 3. As described with reference to FIGS. 1 and 3, the multiple reflector rows 22 each extend along the X-axis direction and are arranged at substantially uniform spacing in the Y-axis direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 6 is an enlarged schematic illustration of five dihedral corner reflectors 30-1 to 30-5 among the many dihedral corner reflectors arranged in the Y-axis direction. Although different reference numerals are used to differentiate the Y-axis positions, the configurations of the dihedral corner reflectors 30-1 to 30-5 are the same as that of the dihedral corner reflector 30 described with reference to FIGS. 4A and 4B. The base part 36 shown in FIG. 4B is not illustrated to avoid complexity in the illustration.

As shown in FIG. 6, the dihedral corner reflectors 30-1 to 30-5 have different angles Θ1 to Θ5 with respect to the virtual plane P0 according to the positions in the Y-axis along the first surface 11*a*. The angles Θ1 to Θ5 of the dihedral corner reflectors 30-1 to 30-5 are illustrated by the angles of the valley-side connecting lines (straight lines) 33-1 to 33-5 with respect to the virtual plane P0.

In the example, the dihedral corner reflectors 30-1 to 30-5 are arranged in this order in the positive direction of the Y-axis. The angles Θ1 to Θ5 of the dihedral corner reflectors 30-1 to 30-5 are set to values that increase in this order. That is, Θ1<Θ2<Θ3<Θ4<Θ5.

Restated more generally, when referenced to the reflector row (a first reflector row) 22 of the dihedral corner reflector set to the smallest value, the angles Θ1 to Θ5 of the dihedral corner reflectors 30-1 to 30-5 are set to values that increase away from the reflector row 22 in one direction along the Y-axis. Also, the angles Θ1 to Θ5 are set to values that decrease away from the reference reflector row 22 in the other direction along the Y-axis. In the example of FIG. 6, when the position of the dihedral corner reflector 30-1 set to the smallest angle is used as the reference, then Θ1<Θ2<Θ3<Θ4<Θ5 in the positive direction of the Y-axis.

The angles Θ1 to Θ5 of the dihedral corner reflectors can be set so that 0°<Θ1 to Θ5<90°. Although the angles between the virtual plane P0 and the first reflecting surfaces 31 are determined conjunctively for the angles Θ1 to Θ5, 45°< (angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45°< (angle between the second reflecting surface 32 and the virtual plane P0)<90°.

The tilts of the dihedral corner reflectors 30-1 to 30-5 also may be set using the angles with respect to tangent planes P1 to P5 of the first surface 11*a* at which the dihedral corner reflectors 30-1 to 30-5 are located. The angles of the dihedral corner reflectors 30-1 to 30-5 with respect to the tangent planes P1 to P5 are set to a constant angle θ regardless of the Y-axis positions of the dihedral corner reflectors 30-1 to 30-5. For example, the angle θ is based on the angle between the horizontal plane and each reflecting surface of a corner cube reflector, and is set to about 30°, and more specifically, 35.3°.

In the image-forming element 10 of the embodiment, when referenced to the base member 12, the angles Θ1 to Θ5 of the dihedral corner reflectors 30-1 to 30-5 are appropriately set so that the light rays incident from the light source located at the first surface 11*a* side form a floating image at the first surface 11*a* side. The floating image formation position is at a different mid-air position from the light source. The angles of the dihedral corner reflectors with respect to the virtual plane P0 are determined by, for example, experiments, simulations, etc.

It is sufficient for the angles of the dihedral corner reflectors with respect to the virtual plane P0 to be set to increase according to the Y-axis position, or to be set to decrease according to the Y-axis position; therefore, the first surface 11*a* may not be a portion of a circular arc of a perfect circle. For example, the first surface 11*a* may be a portion of a circular arc of an ellipse, or may be a portion of a polygon corresponding to the number of reflector rows. Also, it is sufficient to be able to set the angles of the dihedral corner reflectors according to the Y-axis positions of the dihedral corner reflectors; therefore, the angles of the dihedral corner reflectors may be referenced to another plane having any angle with respect to the virtual plane P0 without using the virtual plane P0 as a reference.

First Modification

Figure 7:
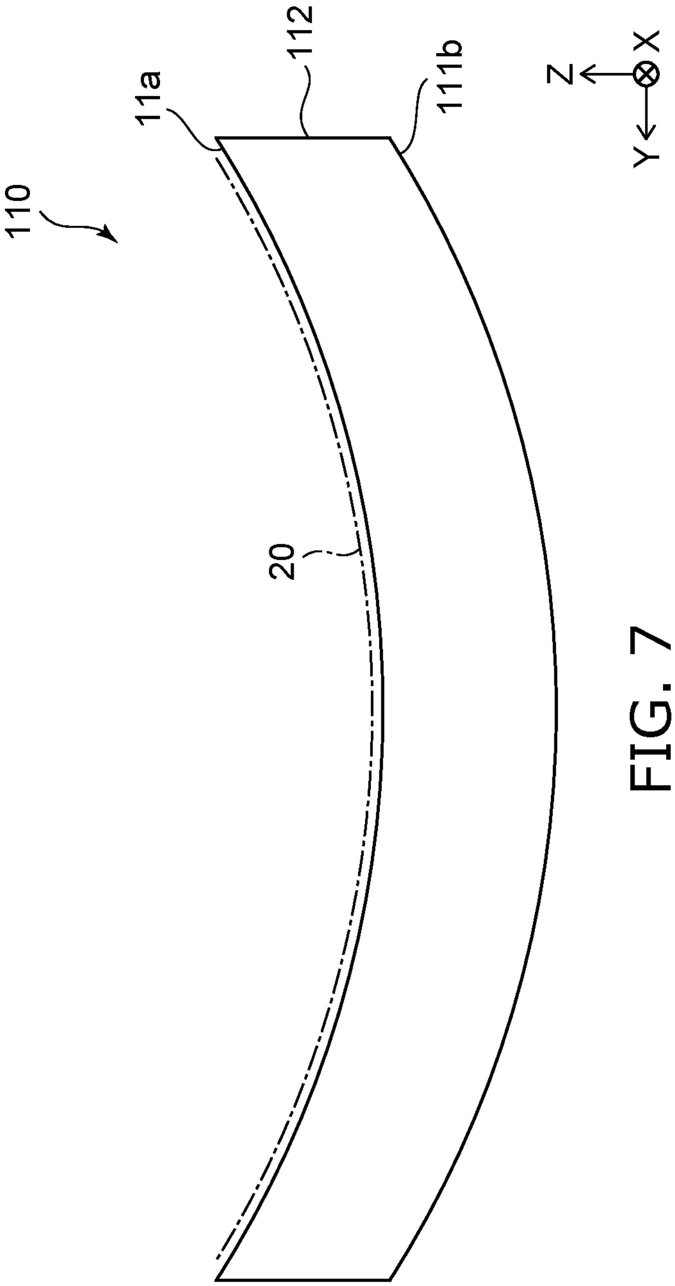
FIG. 7 is a schematic side view illustrating an image-forming element according to a first modification of the first embodiment.

FIG. 7 is a schematic side view illustrating an image-forming element according to the modification.

The configuration of a base member 112 of the modification is different from that of the first embodiment above. Otherwise, the configuration of the base member 112 is the same as that of the first embodiment; the same components are marked with the same reference numerals, and a detailed description is omitted as appropriate.

As shown in FIG. 7, the image-forming element 110 of the modification includes the reflector array 20 and the base member 112. The base member 112 includes the first surface 11*a* and a second surface 111*b*. The reflector array 20 is located on the first surface 11*a*. The second surface 111*b* is located at a position at the side opposite to the first surface 11*a*. According to the modification, the second surface 111*b* has the same shape as the first surface 11*a*, and the first surface 11*a* and the second surface 111*b* both include portions of circular arcs having the same radius when projected onto the YZ-plane. In the example, the shape of the second surface 111*b* when projected onto the YZ-plane is not limited to the same shape as the first surface 11*a* when projected onto the YZ-plane, and may be any different shape.

As in the first embodiment, the base member 112 is formed of a light-transmitting material, and is formed of, for example, a transparent resin.

In the reflector array 20, it is sufficient to set the angles of the dihedral corner reflectors with respect to the virtual plane P0 and the angles of the dihedral corner reflectors with respect to the tangent plane of the first surface 11*a*, as in the first embodiment. Accordingly, the shape of the second surface 111*b* of the base member 112 can be arbitrary. For example, the storage space can be reduced, etc., by setting the shape to be suited to the location at which the image-forming element 110 is housed.

Second Modification

Figure 8A:
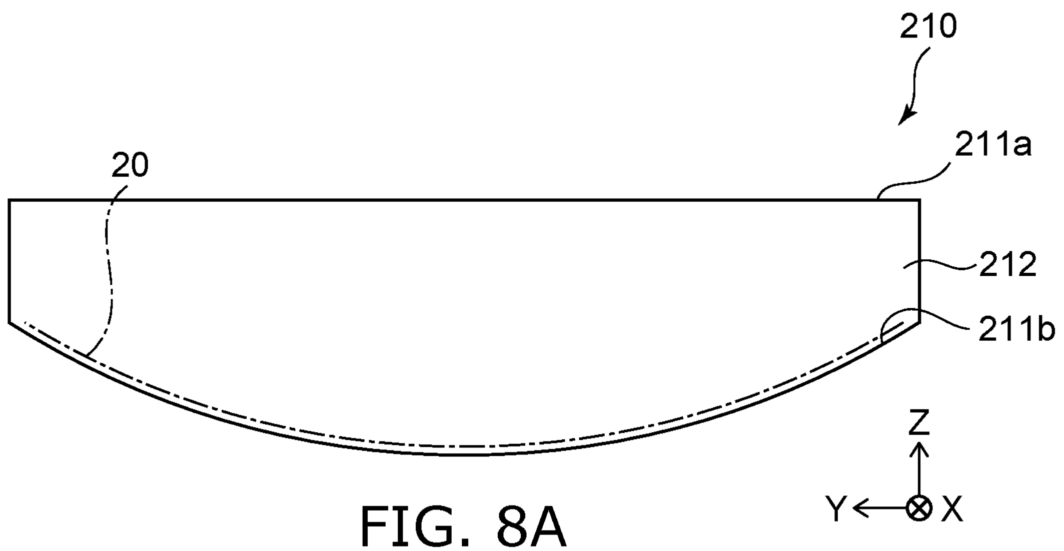
FIG. 8A is a schematic side view illustrating an image-forming element according to a second modification of the first embodiment.
Figure 8B:
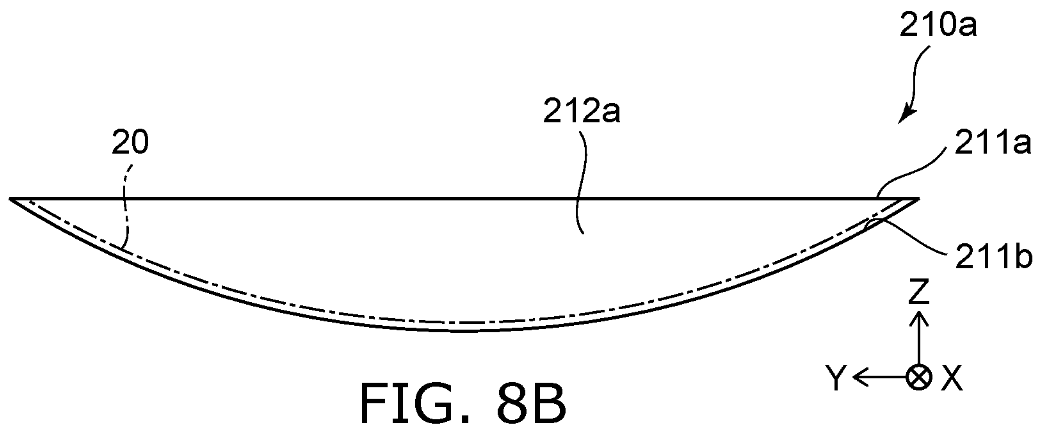
FIG. 8B is a schematic side view illustrating an image-forming element according to the second modification of the first embodiment.

FIGS. 8A and 8B are schematic side views illustrating image-forming elements according to the modification.

The configuration of a base member 212 of the modification is different from those of the first embodiment and the first modification described above. The location at which the reflector array 20 is located according to the modification is different from those of the first embodiment and the first modification. Otherwise, the configuration is the same as that of the first embodiment; the same components are marked with the same reference numerals, and a detailed description is omitted.

As shown in FIG. 8A, an image-forming element 210 includes the reflector array 20 and the base member 212.

The base member 212 includes a first surface 211*a* and a second surface 211*b*. The base member 212 is formed of a light-transmitting material, and is formed of, for example, a transparent resin. The reflector array 20 is located on the second surface 211*b*. In the example, the second surface 211*b* is a surface inside the base member 212, and the reflector array 20 is located inside the base member 212. The reflector array 20 is configured to reflect the light rays from the first surface 211*a* side to form a floating image at the first surface 211*a* side. As long as the two reflecting surfaces of the dihedral corner reflector 30 face the first surface 211*a* side, the outer surface of the base member 212 may be used as the second surface 211*b*, and the reflector array 20 may be formed on the second surface 211*b* outside the base member 212.

The second surface 211*b* includes a portion of a circular arc that is convex toward the negative Z-axis side when projected onto the YZ-plane. In the example, the virtual plane P0 is a virtual plane that is parallel to a tangent plane contacting the portion of the circular arc at the position furthest toward the negative Z-axis side. The second surface 211*b* is such a curved surface, and the reflector array 20 is located on the curved surface.

According to the modification described with reference to FIG. 8A, the configuration of the base member 212 has a thickness such that a certain distance is provided between the first surface 211*a* and the second surface 211*b* even at the two Y-axis direction end portions. It is favorable to reduce the thickness of the base member 212 because the light rays that are incident on the image-forming element 210 reach the reflector array 20 via the base member 212.

As shown in FIG. 8B, an image-forming element 210*a* includes the reflector array 20 and a base member 212*a*. The base member 212*a* includes the first surface 211*a* and the second surface 211*b*, and the distance between the first surface 211*a* and the second surface 211*b* is substantially zero at the two Y-axis direction end portions.

Thus, an appropriate shape of the base member can be arbitrarily selected according to the size of the image-forming element, the material of the base member, the application, etc.

Third Modification

Figure 9A:
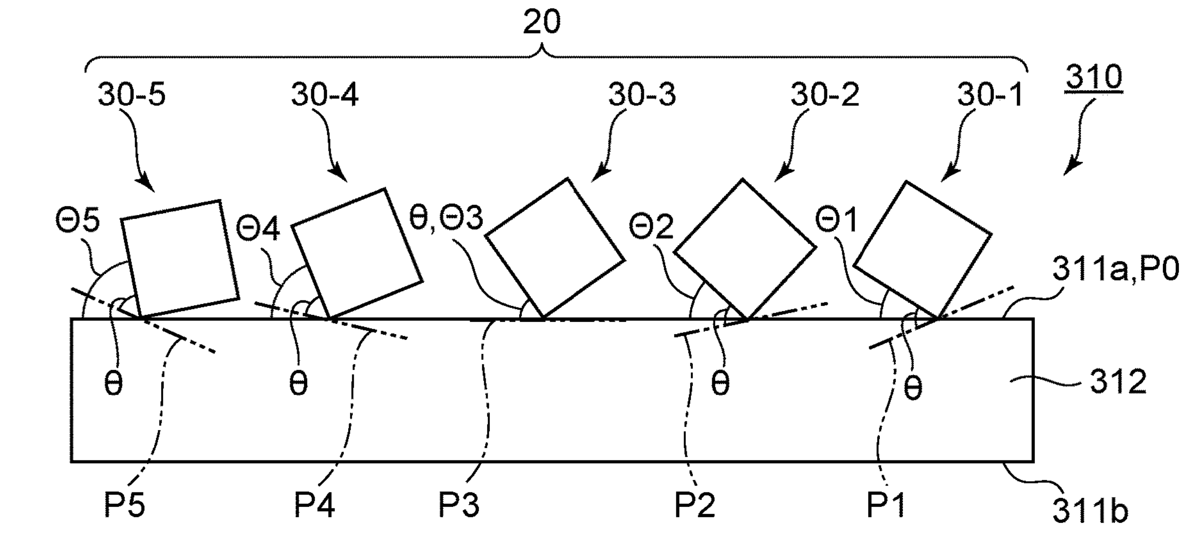
FIG. 9A is a schematic side view illustrating an image-forming element according to a third modification of the first embodiment.
Figure 9B:
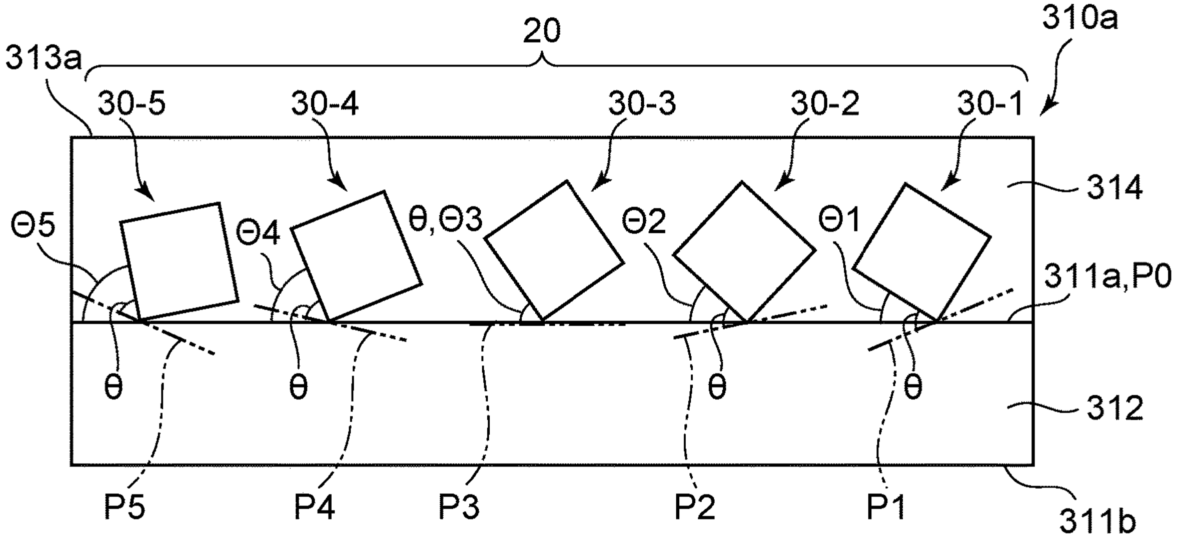
FIG. 9B is a schematic side view illustrating an image-forming element according to the third modification of the first embodiment.

FIGS. 9A and 9B are schematic side views illustrating an image-forming element according to the modification.

As long as the angles of the dihedral corner reflectors with respect to the virtual plane P0 can be set similarly to the first embodiment described above, it is unnecessary to form the reflector array 20 on a curved surface, and the reflector array 20 may be located on one plane.

As in the case described with reference to FIG. 6, FIGS. 9A and 9B are enlarged schematic illustrations of the five dihedral corner reflectors 30-1 to 30-5. The five dihedral corner reflectors 30-1 to 30-5 are shown together with the tilts corresponding to the positions at which the dihedral corner reflectors 30-1 to 30-5 are located.

As shown in FIG. 9A, an image-forming element 310 of the modification includes the reflector array 20 and a base member 312. The base member 312 includes a first surface 311*a* and a second surface 311*b*. The second surface 311*b* is located at a position at the side opposite to the first surface 311*a*. The first surface 311*a* is a plane that is substantially parallel to the XY-plane. The first surface 311*a* may be used as the virtual plane P0. As in the first embodiment and the other modifications, the base member 312 can be formed of a light-transmitting material.

The angles of the dihedral corner reflectors 30-1 to 30-5 with respect to the virtual plane P0 are respectively set to $\Theta 1$ to $\Theta 5$, and the magnitudes of $\Theta 1$ to $\Theta 5$ are $\Theta 1<\Theta 2<\Theta 3<\Theta 4<\Theta 5$. The Y-axis positions of the dihedral corner reflectors 30-1 to 30-5 are the same as the Y-axis positions of the dihedral corner reflectors 30-1 to 30-5 shown in FIG. 6. Accordingly, for the tangent planes P1 to P5 of the circular arc corresponding to the Y-axis positions of FIG. 6, the angles between the dihedral corner reflectors 30-1 to 30-5 and the tangent planes P1 to P5 all have the same value of the angle $\theta$.

As shown in FIG. 9B, an image-forming element 310*a* of the modification includes the reflector array 20 and the base member 312, and further includes a protective layer 314. The configurations of the reflector array 20 and the base member 312 are the same as those of the image-forming element 310 described with reference to FIG. 9A. The protective layer 314 is arranged to cover the reflector array 20 and the first surface 311*a*.

When the light rays are incident on the image-forming element 310*a* via the protective layer 314, the protective layer 314 includes a material having high light transmissivity so that the transmitted amount of the light rays is substantially constant. It is favorable for a surface 313*a* of the protective layer 314 to be sufficiently flat so that the refraction angles of the incident light rays are substantially constant.

According to the modification, the base member 312 can be a flat plate, and so the image-forming elements 310 and 310*a* can be thinner because the thickness of the base member when making the first surface and/or the second surface into curved surfaces can be reduced. The image-forming element 310 shown in FIG. 9A is a member in which the reflector array 20 is formed at a surface, and the other surface is flat. This is therefore favorable for production by a press using a resin base member. Also, the image-forming element 310 is advantageous in terms of production because the image-forming element 310 is easy to produce by a roll-to-roll method, etc. The roll-to-roll method is a production technique in which the material of a base member that is wound into a roll shape is continuously supplied to a process, and patterning, processing, etc., are performed. The roll-to-roll method is widely utilized in the production of plate-shaped and film-like molded resin products, etc.

Fourth Modification

Figure 10A:
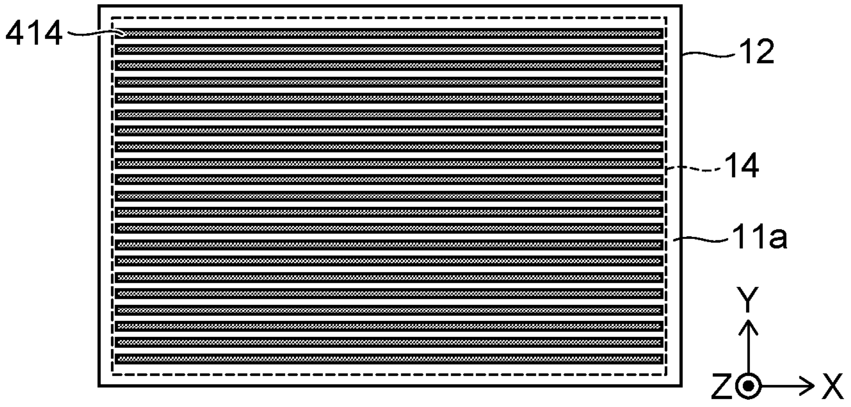
FIG. 10A is a schematic plan view illustrating a portion of an image-forming element according to a fourth modification of the first embodiment.
Figure 10B:
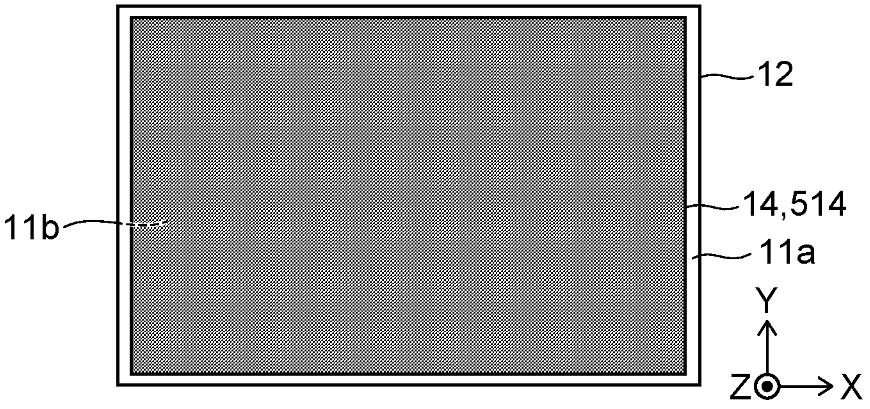
FIG. 10B is a schematic plan view illustrating a portion of the image-forming element according to the fourth modification of the first embodiment.
Figure 10C:
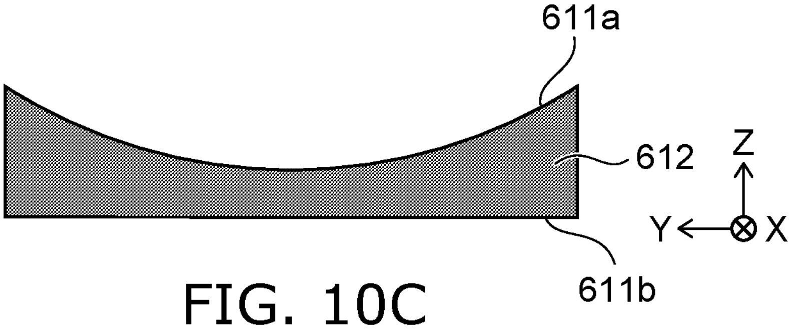
FIG. 10C is a schematic side view illustrating a portion of the image-forming element according to the fourth modification of the first embodiment.

FIGS. 10A to 10C are schematic plan views and a side view illustrating a portion of an image-forming element according to the modification.

FIGS. 10A to 10C show the configuration of the base member of the image-forming element.

According to the first embodiment above and the other modifications described above, there are light rays that are not incident on the first reflecting surface 31 or on the second reflecting surface 32, and such light rays escape as-is in the negative direction of the Z-axis. For example, a portion of the light rays emitted from the same point light source are reflected by the first reflecting surface 31 and travels toward the second reflecting surface 32, and another portion of the light rays escapes in the negative direction of the Z-axis without traveling toward the second reflecting surface 32. The remaining light rays travel straight as-is without being reflected by any of the reflecting surfaces. The light rays and reflected light that escape toward the second surface side may be transmitted as-is by the base member, or may be absorbed. According to the modification, a component that absorbs the light rays and reflected light escaping toward the second surface side is added to the base member.

As shown in FIG. 10A, the base member 12 includes a light-absorbing body (a light-absorbing member) 414 formed on the first surface 11*a*. The light-absorbing body 414 is located in the regions between the reflector rows 22 shown in FIG. 1. For example, the light-absorbing body 414 is formed by coating a black coating in the region between the reflector rows 22. Although the reflector rows 22 are formed at locations not coated with the light-absorbing body 414, the exposed portions of the base part 36 shown in FIGS. 3, 4A, and 4B also may be coated with a black coating.

As shown in FIG. 10B, the base member 12 includes a light-absorbing member 514. The light-absorbing member 514 is provided over the reflector formation region 14 on the first surface 11*a*. This is advantageous in that it is easier to form the light-absorbing member 514 when the pitch of the reflector rows is narrow, etc. The light-absorbing member 514 may be provided over the second surface 11*b*.

When the reflector array is located at the second surface side as described with reference to FIGS. 8A and 8B, the light-absorbing body 414 and/or the light-absorbing member 514 may be formed at the second surface 211*b* of the base member.

When the reflector array is formed on the first surface, a light-absorbing material may be formed over the entire base member.

As shown in FIG. 10C, a base member 612 is formed of a light-absorbing material, and is formed of, for example, a black resin. By making the entire base member light-absorbing, the light rays that escape through the reflector array and travel toward the second surface side can be prevented from being reflected by a second surface 611*b* and returning to a first surface 611*a* side.

Fifth Modification

Figure 11:
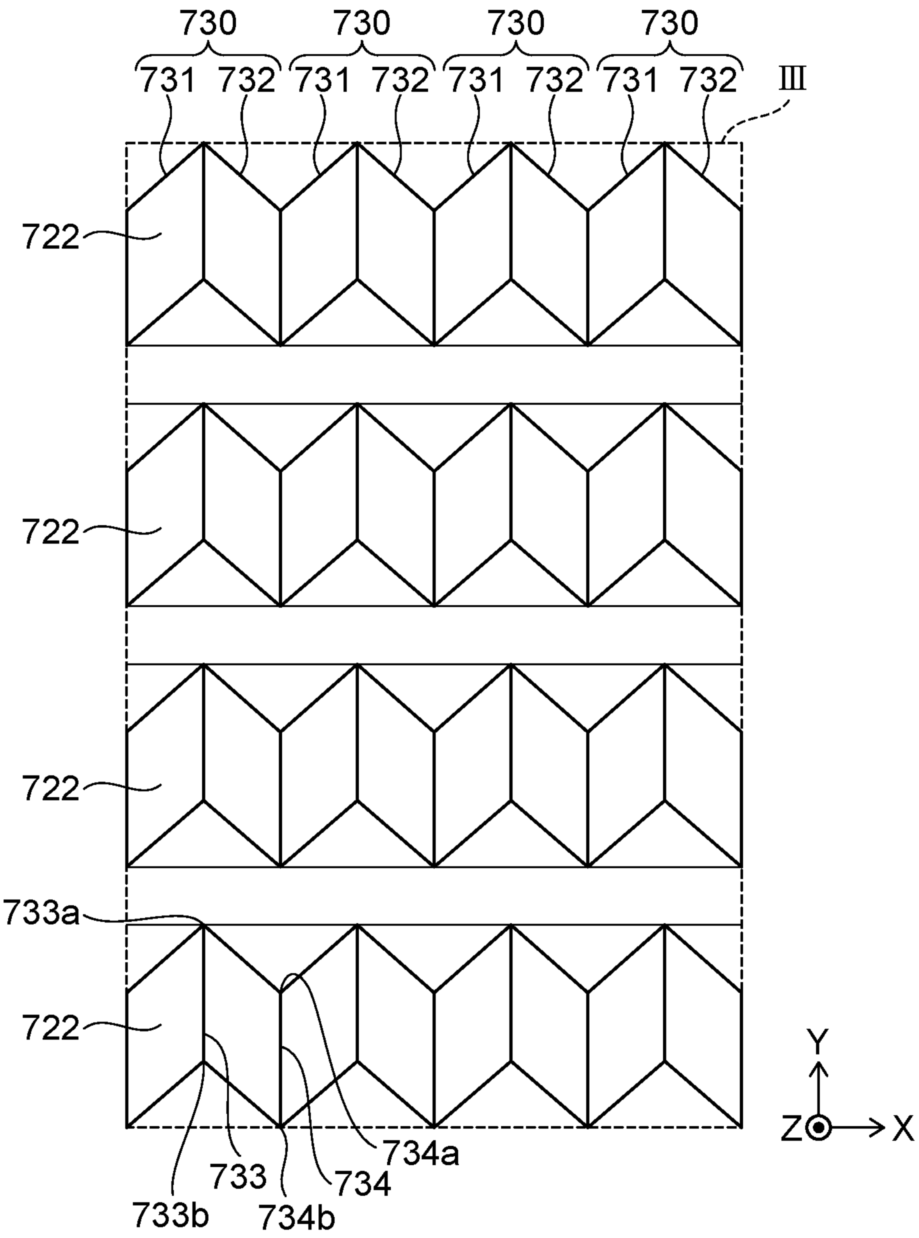
FIG. 11 is a schematic enlarged plan view illustrating a portion of an image-forming element according to a fifth modification of the first embodiment.

FIG. 11 is a schematic enlarged plan view illustrating a portion of an image-forming element according to the modification.

According to the modification, FIG. 11 is an enlarged plan view of a region corresponding to portion III of FIG. 1.

Although the first and second reflecting surfaces 31 and 32 of the dihedral corner reflector 30 each are substantially square when viewed in front-view as described with reference to FIG. 3, the first reflecting surface 31 and the second reflecting surface 32 are not limited thereto, and may be rectangular.

As shown in FIG. 11, multiple reflector rows 722 each include multiple dihedral corner reflectors 730. The dihedral corner reflector 730 includes a first reflecting surface 731 and a second reflecting surface 732. The first reflecting surface 731 and the second reflecting surface 732 each have a rectangular shape with the Y-axis direction sides as the long sides when viewed in front-view. For example, the spacing of the adjacent reflector rows 722 is the same as the spacing of the reflector rows 22 described with reference to FIG. 3.

The first reflecting surface 731 and the second reflecting surface 732 are connected at a valley-side connecting line 733, and the adjacent dihedral corner reflectors 730 are connected to each other at a hill-side connecting line 734. As described with reference to FIGS. 3A and 3B, the phase of the arrangement of the dihedral corner reflectors 730 of the adjacent reflector rows 722 is arbitrary, and may be shifted by ½ period. Also, the spacing of the adjacent reflector rows 722 may be zero, and the base part 36 may be utilized as the spacing.

By setting the sides along the Y-axis direction of the first and second reflecting surfaces 731 and 732 to be the long sides, the area for reflecting the light rays is increased. The luminance of the display when forming the floating image can be set to be higher by using the image-forming element of the modification than when the reflecting surface is square. Although the rectangles of the first and second reflecting surfaces according to the modification have the sides along the Y-axis direction as the long sides, the rectangles may have these sides as the short sides. Thus, the Y-axis direction length of the dihedral corner reflector can be reduced, and the image-forming element can be smaller. When the Y-axis direction length of the dihedral corner reflector is reduced, the area of each reflecting surface is reduced. Therefore, a floating image of a higher-definition image is possible because the number of dihedral corner reflectors formed per unit area can be increased.

Appropriate combinations of the modifications described above are applicable. For example, the dihedral corner reflector that includes the rectangular first reflecting surface and second reflecting surface is applicable to the base members 212 and 212*a* described with reference to FIGS. 8A and 8B. The combinations of the modifications are not limited to two types, and can be three or more types. For example, the dihedral corner reflector that includes the rectangular first reflecting surface and second reflecting surface is applicable to the base member 312 and the protective layer 314 described with reference to FIGS. 9A and 9B, and the base member can be formed of a light-absorbing material as described with reference to FIG. 10C.

Operations of the image-forming elements of the embodiment and modifications of the embodiment will now be described, including the operation principle. Unless otherwise noted hereinbelow, the image-forming element 10 according to the first embodiment described with reference to FIGS. 1 to 6 will be described. The operations of the modifications can be understood to be similar to that of the first embodiment.

The image-forming element of the embodiment forms a floating image at the incident light side by partially utilizing the operation principle of a corner cube reflector. Therefore, first, the operation principle of a corner cube reflector will be described, followed by a description of the operation of the image-forming element of the embodiment.

Figure 12A:
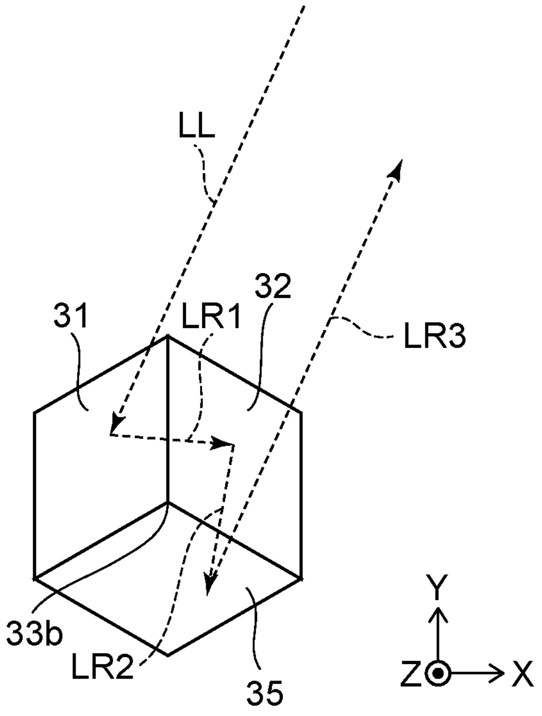
FIG. 12A is a schematic plan view for describing an operation of an image-forming element of a comparative example.

FIG. 12A is a schematic plan view for describing an operation of an image-forming element of a comparative example.

FIG. 12A shows the configuration of the corner cube reflector and how the incident light is reflected.

As shown in FIG. 12A, the corner cube reflector includes the first reflecting surface 31, the second reflecting surface 32, and a third reflecting surface 35. The first reflecting surface 31, the second reflecting surface 32, and the third reflecting surface 35 are connected to be substantially orthogonal to each other. The first reflecting surface 31, the second reflecting surface 32, and the third reflecting surface 35 are arranged so that the vertex 33*b* at which the first reflecting surface 31, the second reflecting surface 32, and the third reflecting surface 35 are connected is positioned lowest in the Z-axis direction.

The light ray LL that is incident on the first reflecting surface 31 is reflected by the first reflecting surface 31. The once-reflected light LR1 that is reflected by the first reflecting surface 31 is reflected by the second reflecting surface 32. The twice-reflected light LR2 that is reflected by the second reflecting surface 32 is reflected by the third reflecting surface 35. A thrice-reflected light LR3 that is reflected by the third reflecting surface 35 is emitted from the corner cube reflector. Because the law of reflection holds at each reflecting surface, the thrice-reflected light LR3 that is emitted from the corner cube reflector is parallel to the light ray LL incident on the corner cube reflector. Although the light ray LL described above is incident on the first reflecting surface 31, the emitted light is parallel to the incident light even when the light ray LL is incident on the second reflecting surface 32 or incident on the third reflecting surface. Such an operation is called retroreflection.

Figure 12B:
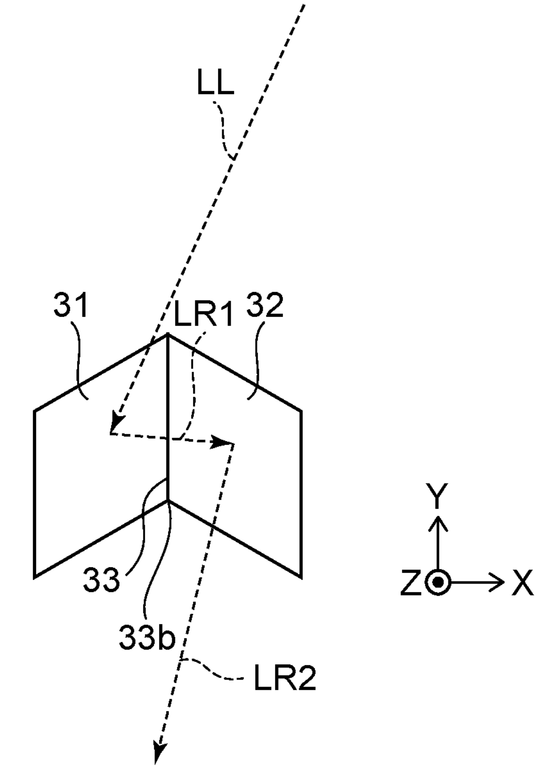
FIG. 12B is an example of a schematic plan view for describing an operation of the image-forming element of the first embodiment.

FIG. 12B is a schematic plan view for describing an operation of the image-forming element of the embodiment.

As shown in FIG. 12B, the first reflecting surface 31 and the second reflecting surface 32 are arranged to be substantially orthogonal and are connected at the valley-side connecting line 33. The vertex 33*b* is arranged to be the minimum value in the Z-axis direction. Comparing the corner cube reflector and the dihedral corner reflector 30 of FIG. 12A, the dihedral corner reflector 30 differs from the corner cube reflector in that the third reflecting surface 35 is not included.

Because the dihedral corner reflector 30 does not include the third reflecting surface 35 shown in FIG. 12A, the twice-reflected light LR2 that is reflected by the second reflecting surface 32 travels straight as-is. Here, because the valley-side connecting line 33 is arranged at a prescribed angle from the XY-plane, the twice-reflected light LR2 that is emitted from the dihedral corner reflector 30 is emitted toward the same side as the side from which the light ray LL is incident.

Figure 13:
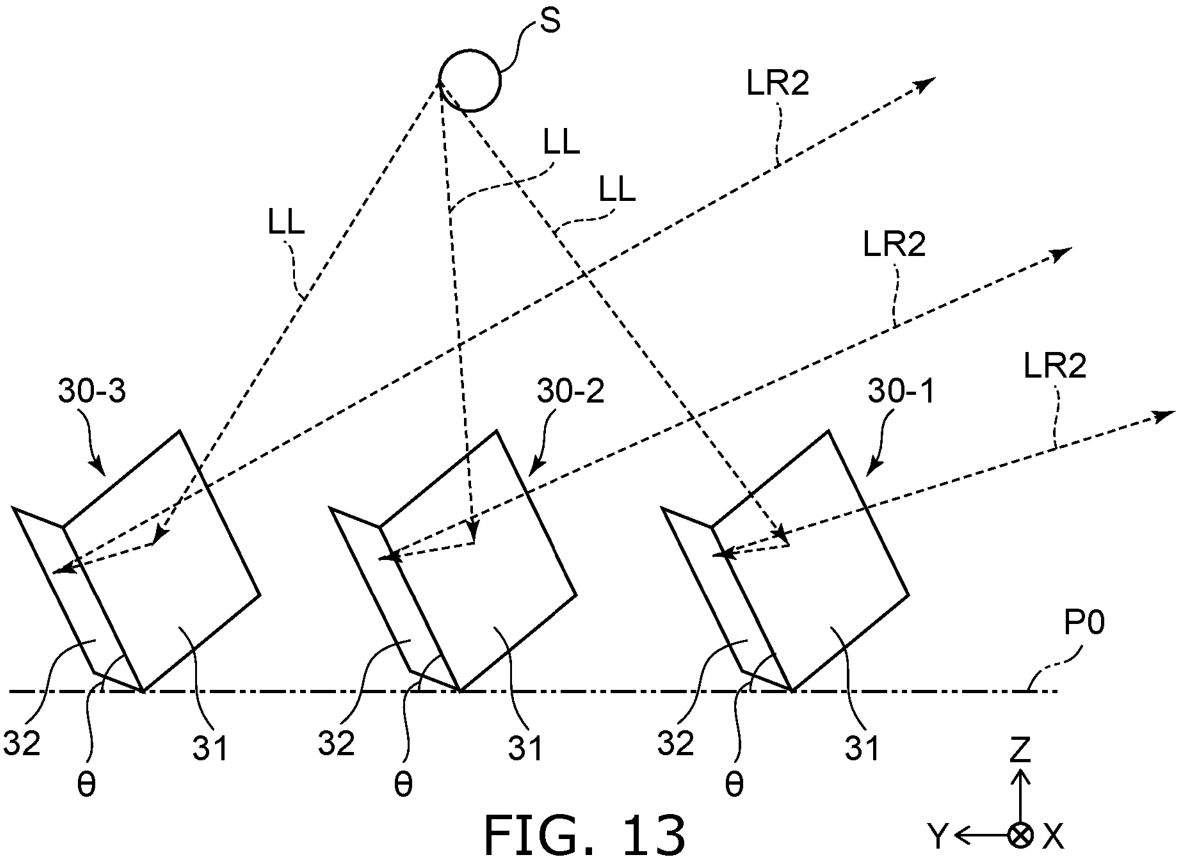
FIG. 13 is an example of a schematic side view for describing an operation of the image-forming element of the embodiment, and illustrates an image-forming element of another comparative example.

FIG. 13 is a schematic side view illustrating an image-forming element of another comparative example to describe the operation of the image-forming element of the embodiment.

In FIG. 13, the multiple reflector rows 22 shown in FIGS. 1 and 3 each extend along the X-axis direction, and the multiple reflector rows 22 are arranged at constant spacing in the Y-axis direction. FIG. 13 shows the three dihedral corner reflectors 30-1 to 30-3. The dihedral corner reflectors 30-1 to 30-3 each show one of the three reflector rows 22. The dihedral corner reflectors 30-1 to 30-3 are shown in slightly rotated states on the XY-plane to display how the light rays are reflected. Although the reference numerals are different to differentiate the Y-axis positions, the configurations of the dihedral corner reflectors 30-1 to 30-3 are the same as that of the dihedral corner reflector 30 described with reference to FIGS. 4A and 4B.

The dihedral corner reflectors 30-1 to 30-3 are located on the virtual plane P0, and are arranged in a straight line along the Y-axis direction. A light source S is located directly above the dihedral corner reflectors 30. More specifically, the light source S is arranged above the dihedral corner reflectors 30-1 to 30-3 so that a light ray parallel to the Z-axis is incident on one of the dihedral corner reflectors 30-1 to 30-3. The light source S spreads in two dimensions or three dimensions, and FIG. 13 shows a case where light rays emitted from one point of the light source S are incident respectively on the dihedral corner reflectors 30-1 to 30-3. This is similar for the configurations of the light source S and the dihedral corner reflectors 30-1 to 30-3 of FIGS. 14 and 15 below.

As shown in FIG. 13, the light rays LL that are emitted from the light source S and incident on the first reflecting surfaces 31 of the dihedral corner reflectors 30-1 to 30-3 are reflected by the first reflecting surfaces 31 of the dihedral corner reflectors 30-1 to 30-3 toward the second reflecting surfaces 32. The three second reflecting surfaces 32 each emit the twice-reflected light LR2. Here, the three dihedral corner reflectors 30-1 to 30-3 are arranged to be tilted at the same angle θ with respect to the virtual plane P0. In such a case, the angle θ is set to a value greater than 0° and less than 90°. For example, the angle θ is set to 35.3°. According to the law of reflection by each reflecting surface, the twice-reflected light LR2 that is emitted by the dihedral corner reflectors 30-1 to 30-3 arranged along the Y-axis undesirably spreads without forming a floating image. When e is set to 0°, a floating image is formed at the light source S side (see Patent Literature 1, etc.), and when θ is set to 90°, the operation of a transmission-type image-forming element is realized in which a floating image is formed via the dihedral corner reflectors at the side opposite to the light source S when referenced to the image-forming element.

The angle θ is equal to the angle with respect to the mounting surface of the corner cube reflector described with reference to FIG. 12A. That is, the angle θ is the angle with respect to the mounting surface of the retroreflective image-forming element utilizing the corner cube reflector. This angle is the angle with respect to the mounting surface of the connecting line of the first and second reflecting surfaces 31 and 32. The mounting surface of the corner cube reflector corresponds to the virtual plane P0 of FIG. 13.

In the image-forming element of the embodiment, the dihedral corner reflectors are located at different angles with respect to the virtual plane P0 according to the positions in the Y-axis so that the reflected light reflected twice by the dihedral corner reflectors 30 is reflected toward the same side as the light source S and forms a floating image.

Figure 14:
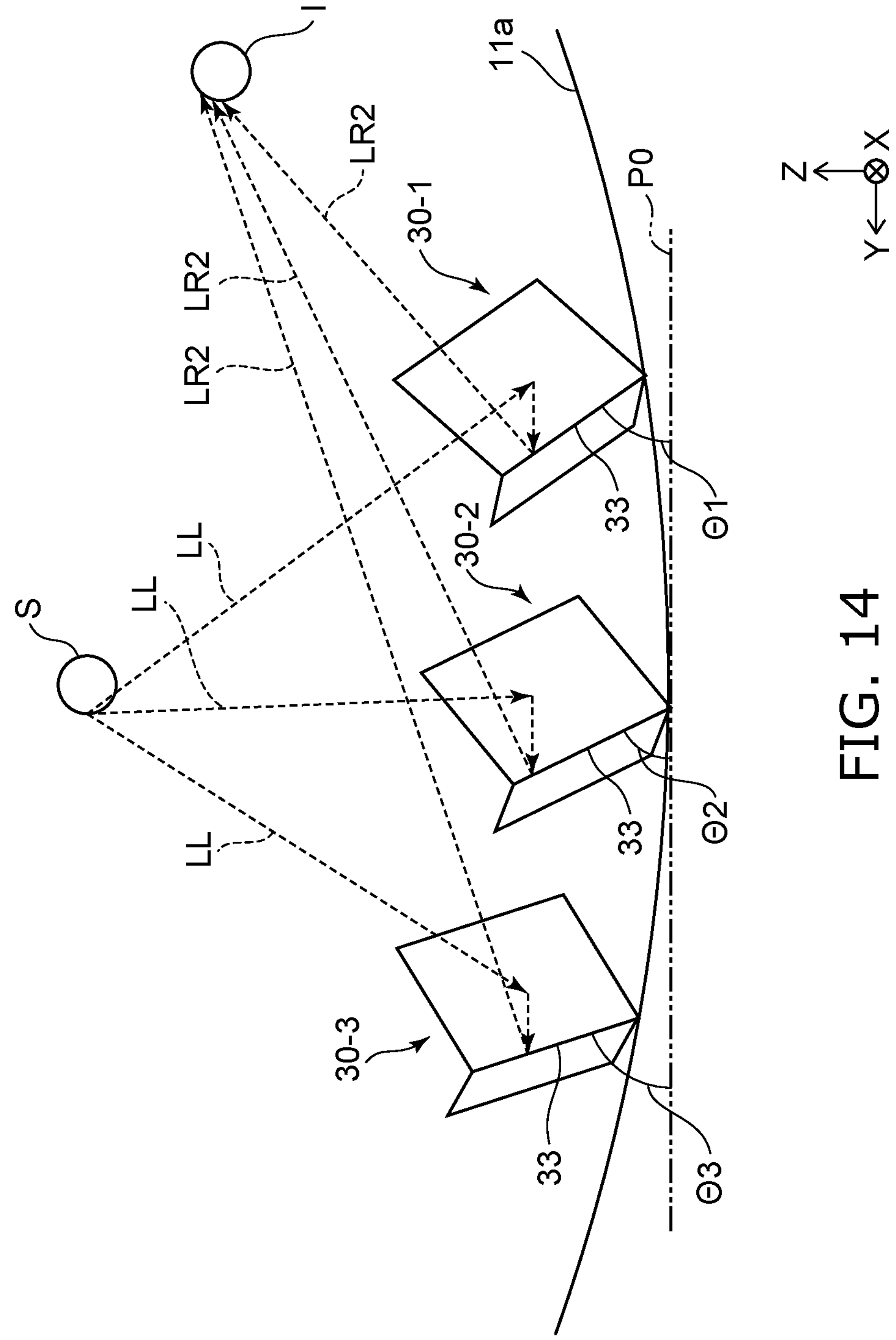
FIG. 14 is an example of a schematic side view for describing an operation of the image-forming element of the embodiment.
Figure 15:
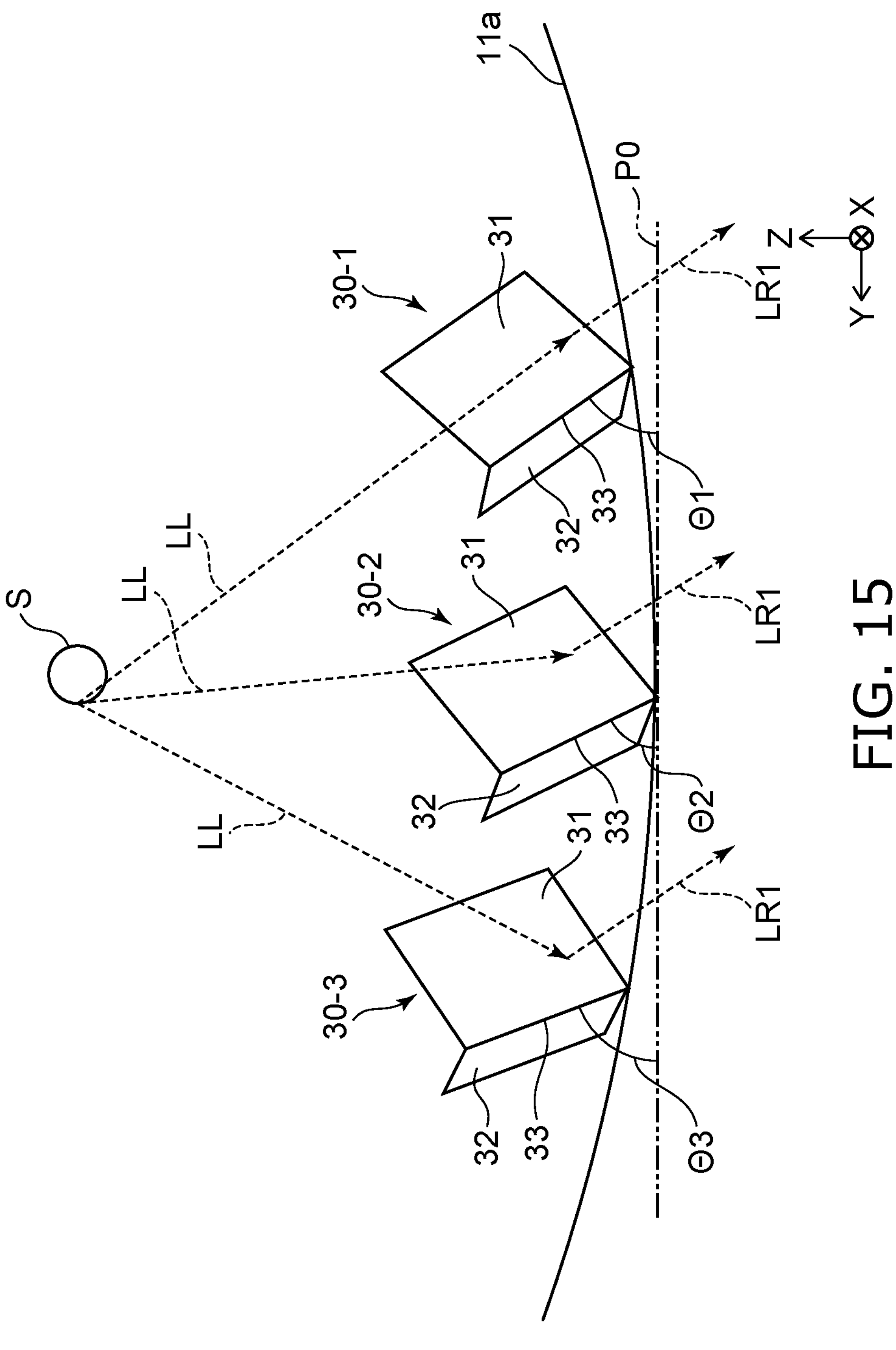
FIG. 15 is an example of a schematic side view for describing an operation of the image-forming element of the first embodiment.

FIGS. 14 and 15 are schematic side views for describing the operation of the image-forming element of the embodiment.

In the image-forming element of the embodiment as shown in FIG. 14, the first surface 11*a* is set to be a portion of a circular arc that is convex toward the negative Z-axis side when projected onto the YZ-plane. The dihedral corner reflectors 30-1 to 30-3 are located on the first surface 11*a*. In the example, the angles Θ1 to Θ3 of the tilts of the dihedral corner reflectors 30-1 to 30-3 with respect to the virtual plane P0 are set to increase in the positive direction of the Y-axis. Thus, by setting the angles Θ1 to Θ3, the twice-reflected light LR2 that is reflected twice by the dihedral corner reflectors 30 forms a floating image I at the first surface 11*a* side at which the light source S is located.

The description above is conceptually understood as follows. Namely, when the dihedral corner reflectors 30-1 to 30-3 are formed on a flat surface at angles greater than 0° and less than 90°, the twice-reflected light of the dihedral corner reflectors 30-1 to 30-3 undesirably spreads without forming a floating image at the side at which the light source is located. Therefore, by curving the surface at which the dihedral corner reflectors 30-1 to 30-3 are formed toward the negative Z-axis side along the Y-axis direction, the twice-reflected light is focused, and a floating image is formed at the side at which the light source is located.

FIG. 15 shows when the light rays LL incident from the light source S are not reflected twice respectively by the dihedral corner reflectors 30-1 to 30-3, but are reflected once, and are not emitted toward the same side as the light source S.

As shown in FIG. 15, when the light ray LL emitted from the light source S does not travel toward the second reflecting surface 32 after being incident on the first reflecting surface 31, the once-reflected light LR1 that is reflected by the first reflecting surface 31 travels below the dihedral corner reflector 30. This is because the reflector rows 22 shown in FIGS. 1 and 3 are arranged along the Y-axis direction with spacing interposed. Although not illustrated, the light ray LL that is emitted from the light source S and is not incident on the first reflecting surface 31 or on the second reflecting surface 32 travels as-is below the dihedral corner reflectors 30-1 to 30-3.

Thus, in the image-forming element of the embodiment, by setting the angles Θ1 to Θ3 with respect to the virtual plane of the dihedral corner reflectors 30-1 to 30-3 according to the Y-axis positions of the dihedral corner reflectors 30-1 to 30-3, a floating image can be formed at the same side as the light source S. Simultaneously, by using the dihedral corner reflectors, the once-reflected light and the light rays that are not reflected do not form a floating image at the same side as the light source S. Therefore, false images other than the real image are not observed at the light source S side. Also, surreptitious viewing of the floating image can be prevented.

The image-forming element 10 of the embodiment operates even when the position of the light source and the position of the floating image are interchanged.

Figure 16:
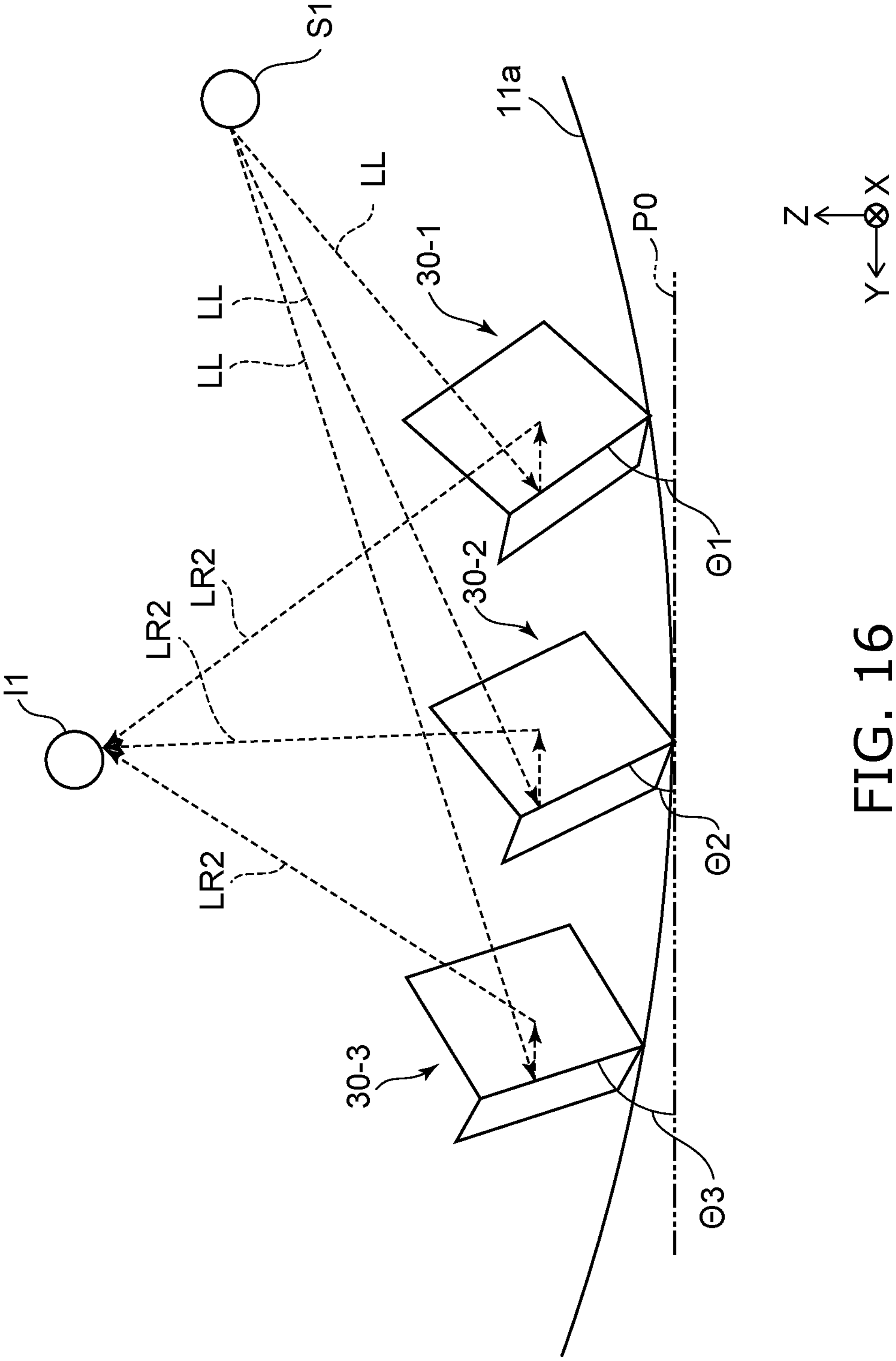
FIG. 16 is an example of a schematic side view for describing an operation of the image-forming element of the first embodiment.
Figure 17:
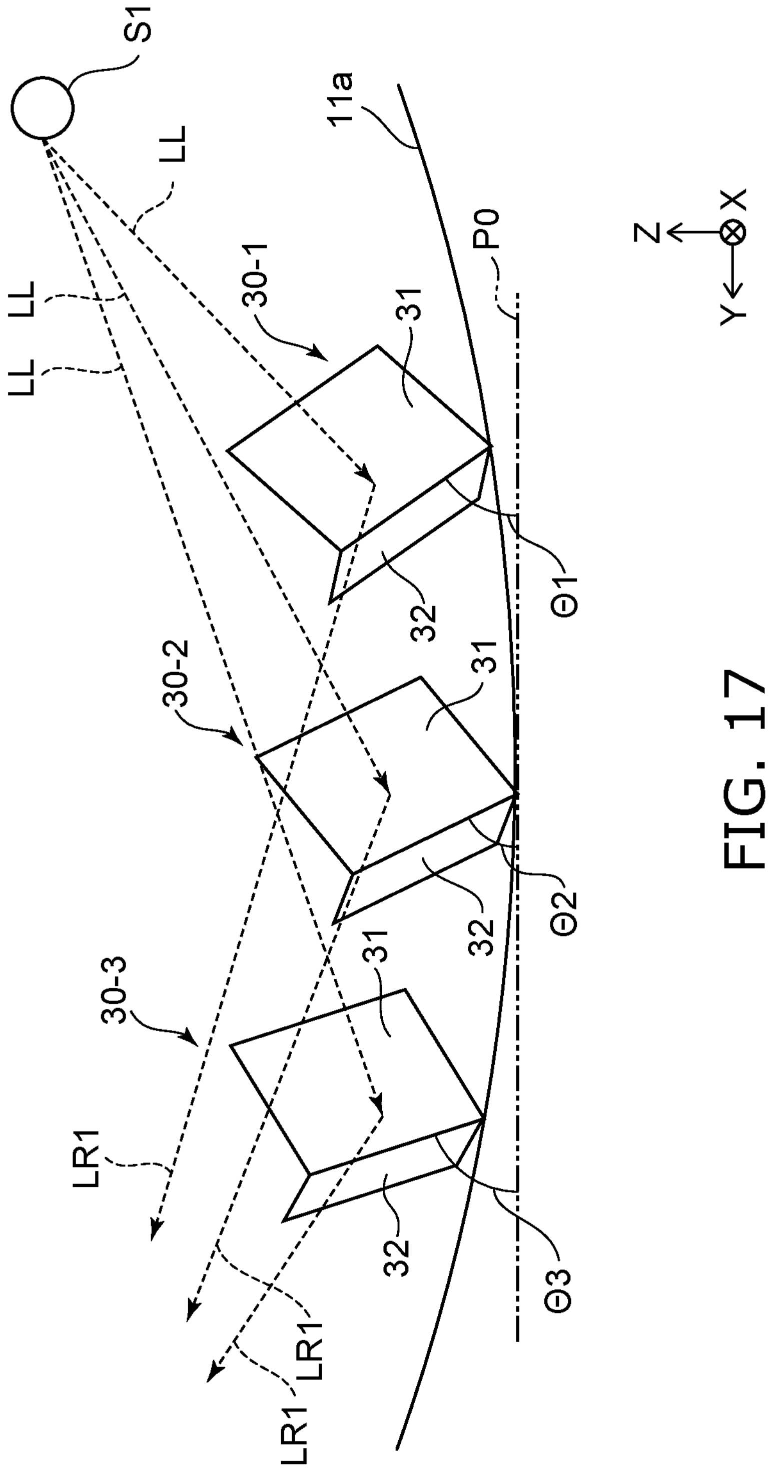
FIG. 17 is an example of a schematic side view for describing an operation of the image-forming element of the first embodiment.

FIGS. 16 and 17 are schematic side views for describing operations of the image-forming element of the embodiment.

In FIGS. 16 and 17, the configurations of the dihedral corner reflectors 30-1 to 30-3 and the relationship between the dihedral corner reflectors 30-1 to 30-3, the first surface 11*a*, and the virtual plane P0 are the same as those described with reference to FIGS. 14 and 15.

As shown in FIG. 16, a light source S1 is located at the position of the floating image I described with reference to FIG. 14; in such a case, a floating image I1 is formed at the position of the light source S of FIG. 14. The light rays LL that are emitted from the light source S1 are reflected twice respectively by the dihedral corner reflectors 30-1 to 30-3, and the twice-reflected light LR2 forms a floating image at the position of the floating image I1.

As shown in FIG. 17, there are cases where the light rays LL that are incident on the dihedral corner reflectors 30 from the light source S1 are reflected by the first reflecting surfaces 31, and then the once-reflected light LR1 is emitted toward the first surface 11*a* side without traveling toward the second reflecting surfaces 32. Although such once-reflected light LR1 diverges and does not form an image, such once-reflected light LR1 is observed as a false image of the light source at a different position from the light source S1. In other words, when the once-reflected light that is once-reflected by the dihedral corner reflectors 30 is reflected toward the first surface 11*a* side without being reflected twice, the once-reflected light forms a real image at the side at which the light source S1 is located, and a false image may be observed at a different position from the floating image formation position of the real image. In such a case, the position at which the real image is formed can be at the vicinity directly above the dihedral corner reflectors 30-1 to 30-3.

As conceptually described above, the angles of the dihedral corner reflectors may be determined by arranging the dihedral corner reflectors on a flat surface and then curving the flat surface along the Y-axis direction and determining the angles corresponding to the curve; or the angle may be determined using other methods. For example, the angles of the dihedral corner reflectors with respect to the virtual plane P0 may be determined by setting the angular difference between the adjacent dihedral corner reflectors along the Y-axis to be a prescribed value. For example, when the prescribed value is set to 1°, then Θ2=Θ1+1° and Θ3=Θ2+1° may be set.

In either the case of the position of the light source S or the case of the position of the light source S1, the angles of the dihedral corner reflectors can be appropriately set by using experiments, simulation, etc., so that the light rays that are incident on the dihedral corner reflectors are reflected twice and form a floating image at the desired position. For example, according to the case of the embodiment shown in FIG. 14, the light source S is substantially directly above the reflector array; or, according to the case of the embodiment shown in FIG. 16, the position at which the floating image I1 is formed is substantially directly above the reflector array. By appropriately adjusting the angles of the dihedral corner reflectors with respect to the virtual plane P0, it is also possible to appropriately modify the positions of the light sources S and S1 and/or the floating images I and I1. When making such a design modification, ray analysis tools such as ray tracing simulation, etc., can be effectively utilized.

Figure 18:
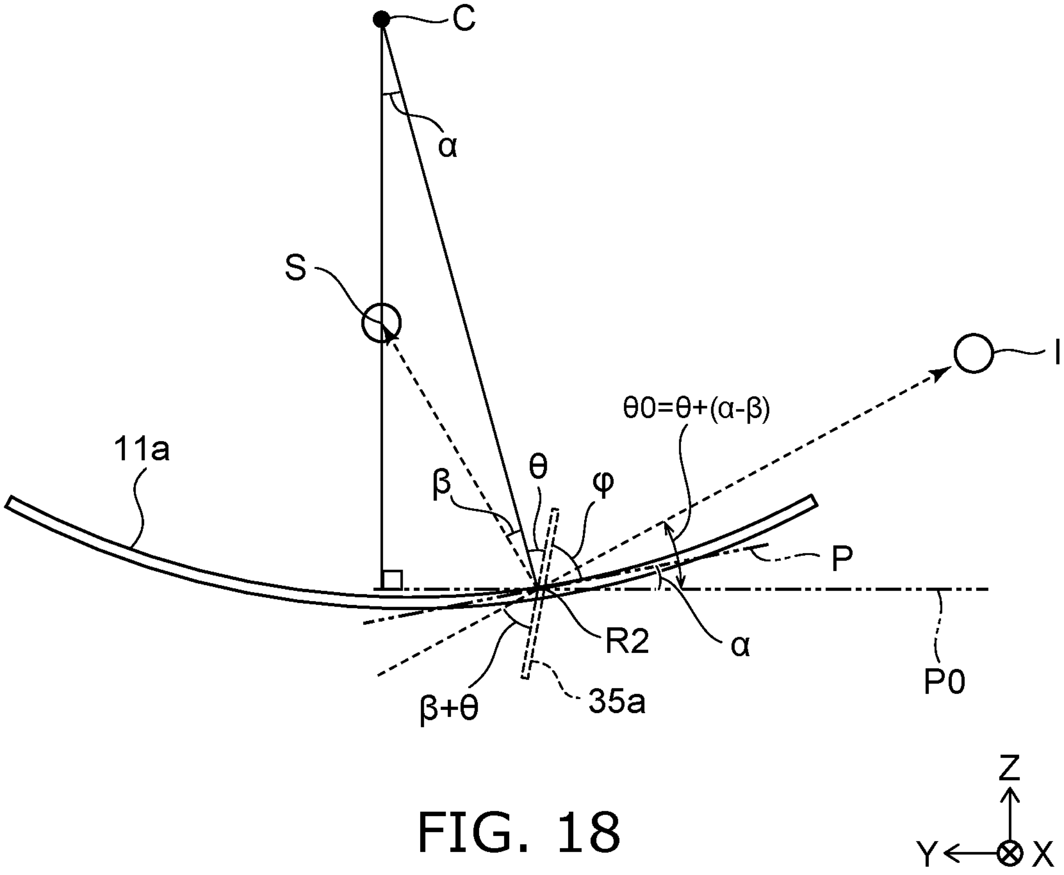
FIG. 18 is a schematic view for describing a calculation example related to the image-forming element of the first embodiment.

FIG. 18 is a schematic view for describing a calculation example related to the image-forming element of the embodiment.

Hereinbelow, a method for determining the emergence angle of the twice-reflected light reflected twice by the dihedral corner reflector of the image-forming element 10 shown in FIG. 1 will now be described using FIG. 18. The emergence angle of the twice-reflected light is determined by utilizing the retroreflection by the three reflecting surfaces of the corner cube reflector described with reference to FIG. 12A. The third reflecting surface of the corner cube reflector is temporarily provided in FIG. 18 and taken as a temporary reflecting surface 35*a*. The temporary reflecting surface 35*a* corresponds to the third reflecting surface 35 described with reference to FIG. 12A.

In the dihedral corner reflector 30 shown in FIG. 12B, the angle of the valley-side connecting line 33 with respect to the tangent plane is used as the tilt of the dihedral corner reflector 30. The angle of the valley-side connecting line 33 corresponds to the angle with respect to the tangent plane of the third reflecting surface 35 of the corner cube reflector shown in FIG. 12A.

As shown in FIG. 18, the first surface 11*a* is a portion of a circular arc having a center C. In FIG. 18, the tangent plane P of the first surface 11*a* is shown, and the temporary reflecting surface 35*a* is arranged to be tilted at an angle $\phi$ with respect to the tangent plane P. As described with reference to FIG. 19 below, the angle ¢ is about 60°, and more accurately, about 54.7°.

The first surface 11*a* and the temporary reflecting surface 35*a* cross at a point R2. The light rays that are emitted from the light source S include the line segment SR2. The line segment SR2 and the line segment CR2 form an angle $\beta$.

The angle between the line segment CS and the line segment CR2 is equal to an angle $\alpha$, wherein the angle $\alpha$ is the angle between the virtual plane P0 and the tangent plane P.

As described with reference to FIG. 19 below, the angle $\theta$ is about 30°, and more accurately, about 35.3°, wherein the angle $\theta$ is the angle between the line segment CR2 and the temporary reflecting surface 35*a*.

Accordingly, an emergence angle $\theta 0$ can be determined by $\theta+(\alpha-\beta)$, wherein the emergence angle $\theta 0$ is the angle between the virtual plane P0 and the reflected light due to the second reflection. Here, by setting the position of the center C of the circular arc so that the length of the line segment CS and the length of the line segment SR2 are equal, then $\alpha \approx \beta$, and the reflected light can form a floating image because the emergence angles $\theta 0$ are uniform at substantially $\theta$. Setting the length of the line segment CS and the length of the line segment SR2 to be equal is substantially equivalent to setting the radius of the circular arc to be 2 times the length of the line segment SR2; accordingly, it is favorable to set the radius of the circular arc forming the first surface 11*a* to be substantially 2 times the distance from the position of the light source S to the first surface 11*a*.

FIGS. 19 to 21C are schematic views for describing the calculation example related to the image-forming element of the embodiment.

Figure 19:
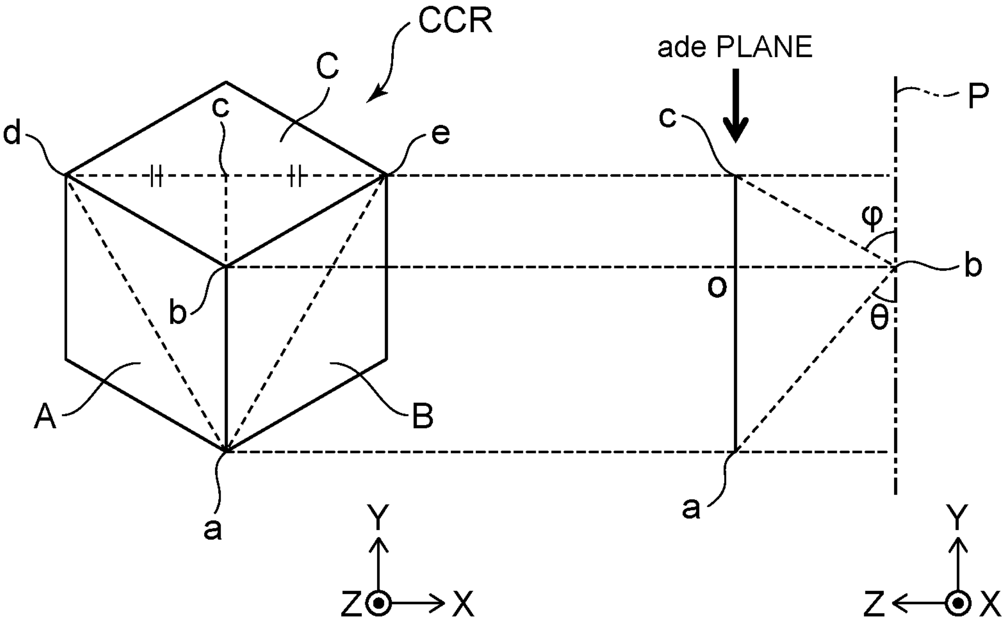
FIG. 19 is a schematic view for describing a calculation example related to the image-forming element of the first embodiment.

FIG. 19 is a drawing of a corner cube reflector CCR to calculate the angle $\theta$ of the dihedral corner reflector with respect to the tangent plane P.

Figure 20A:
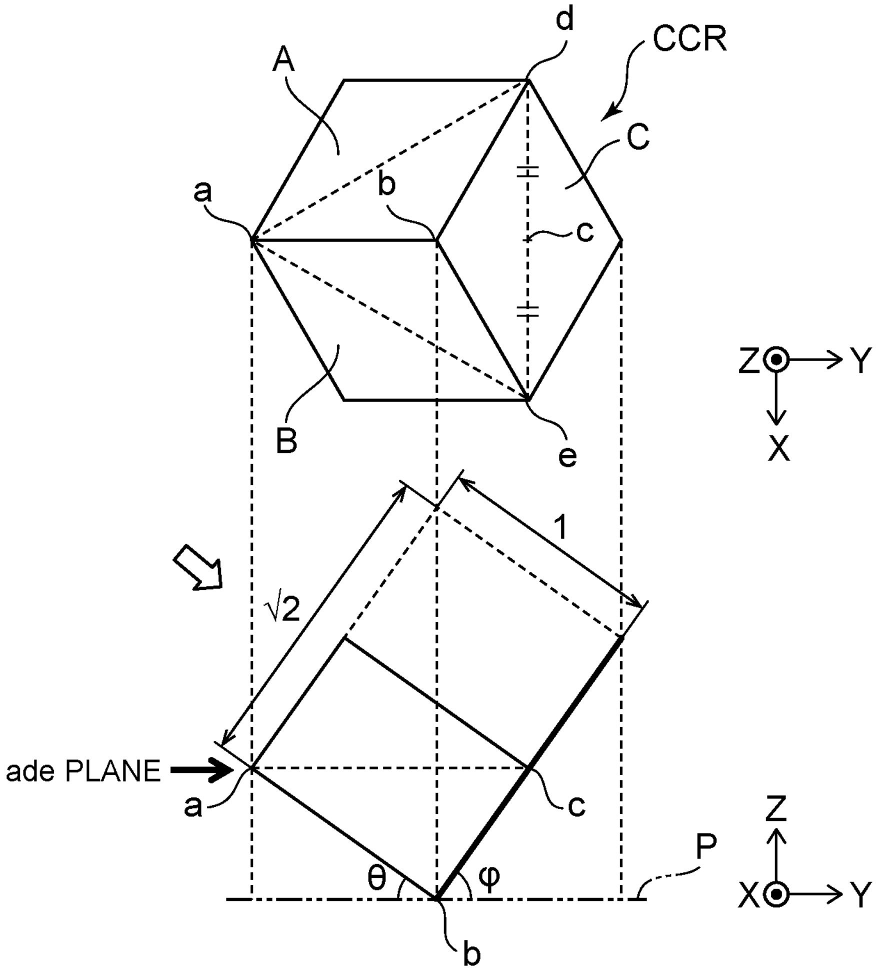
FIG. 20A is a schematic view for describing a calculation example related to the image-forming element of the first embodiment.
Figure 20B:
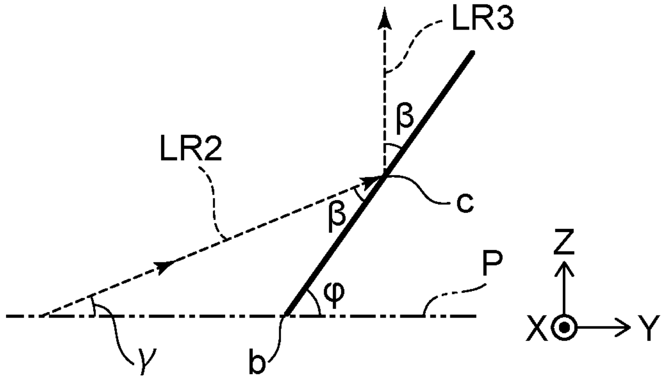
FIG. 20B is a schematic view for describing a calculation example related to the image-forming element of the first embodiment.

FIGS. 20A and 20B are drawings of the corner cube reflector CCR to calculate an emergence angle $\gamma$ of the dihedral corner reflector with respect to the tangent plane P.

Figure 21A:
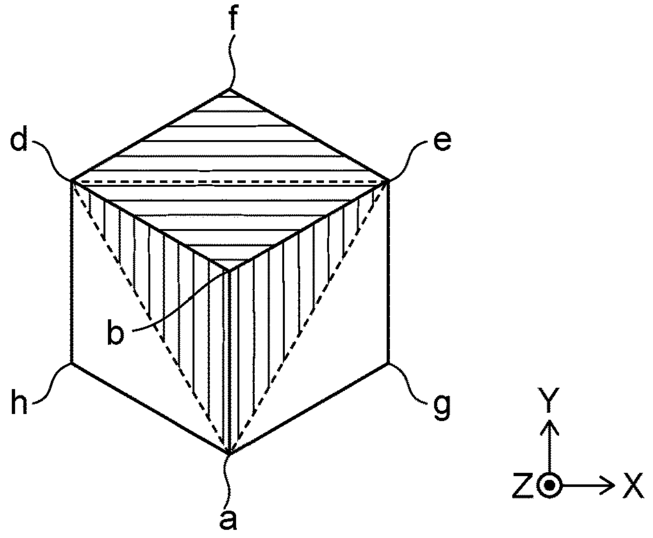
FIG. 21A is a schematic view for describing a calculation example related to the image-forming element of the first embodiment.
Figure 21B:
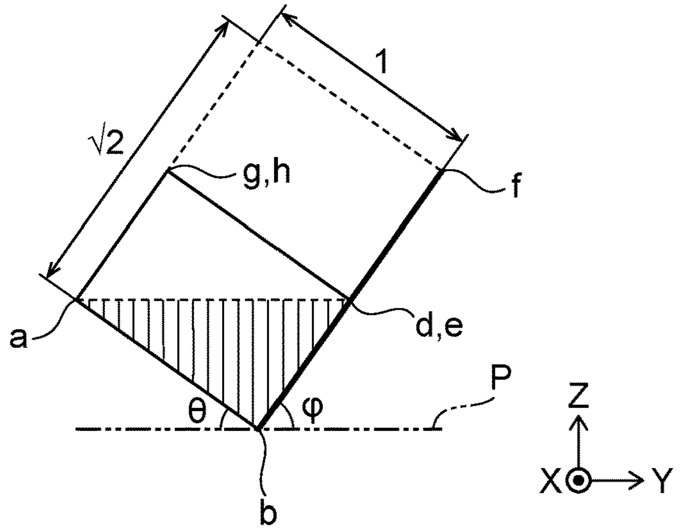
FIG. 21B is a schematic view for describing a calculation example related to the image-forming element of the first embodiment.
Figure 21C:
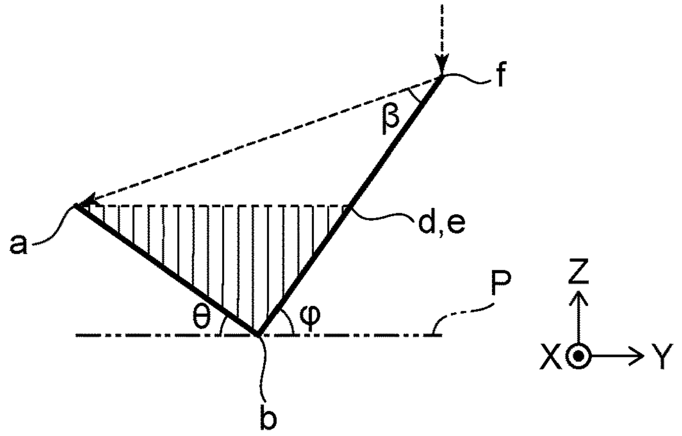
FIG. 21C is a schematic view for describing a calculation example related to the image-forming element of the first embodiment.

FIGS. 21A to 21C are drawings of the corner cube reflector CCR to explain that the dihedral corner reflector of the image-forming element of the embodiment is different from a well-known corner cube reflector.

The drawing at the left of FIG. 19 is a plan view of the corner cube reflector CCR.

As shown in the drawing at the left of FIG. 19, the corner cube reflector CCR includes three reflecting surfaces A, B, and C. In the corner cube reflector described with reference to FIG. 12A, the reflecting surface A corresponds to the second reflecting surface 32; the reflecting surface B corresponds to the first reflecting surface 31, and the reflecting surface C corresponds to the third reflecting surface 35. The corner cube reflector CCR includes the points a to e; the points a and b are the end portions of a connecting line of the reflecting surfaces A and B; the points b and d are the end portions of the connecting line of the reflecting surfaces A and C, and the points b and e are the end portions of the connecting line of the reflecting surfaces B and C. The corner cube reflector CCR contacts the tangent plane P at the point b. This situation corresponds to the dihedral corner reflector 30 contacting the tangent plane P at the vertex 33*b* described with reference to FIGS. 4A and 4B. The point c is the midpoint of the line segment de. In the example, the reflecting surfaces A, B, and C are taken to be squares having sides with lengths of 1.

The drawing at the right of FIG. 19 is a partial side view of the corner cube reflector CCR, and shows the tangent plane P at which the corner cube reflector CCR is mounted. Also, the relationship of the points a, b, c, and o is shown to correspond to the drawing at the left of FIG. 19. The points d and e overlap the point c.

As shown in the drawing at the right of FIG. 19, the virtual plane ade can be defined as a plane parallel to the tangent plane P. Accordingly, the length of the line segment bc is $1/\sqrt{2}$.

The point at which the normal of the tangent plane P passing through the point b crosses the plane ade is called o. Because the line segment ac is a bisector of the equilateral triangle ade of which one side has a length of $\sqrt{2}$, the length of the line segment ac is $\sqrt{3}/\sqrt{2}$; therefore, the length of the line segment co is $1/\sqrt{6}$.

From the above, cos $\phi$=line segment co/line segment bc=$1/\sqrt{3}$, and $\phi \approx 54.7°$. The angle $\theta$ between the line segment ab and the tangent plane P is $\theta=90°-\phi \approx 35.3°$.

In FIGS. 20A and 20B, the configuration of the corner cube reflector CCR is the same as that of FIG. 19. In the upper drawing of FIG. 20A, the corner cube reflector CCR is shown rotated clockwise 90° from FIG. 19 for convenience of description. The lower drawing of FIG. 20A is a side view of the corner cube reflector CCR shown to correspond to the positions of the points a, b, and c of the upper drawing of FIG. 20A. When viewed from the arrow of FIG. 20A, the reflecting surface C of which one side has a length of 1 is visible, and the length of the diagonal of the reflecting surface C is $\sqrt{2}$. In the lower drawing of FIG. 20A, the points d and e overlap the point c. Also, the plane ade is the same as the plane ade shown in FIG. 19.

As shown in FIG. 20A, the plane ade is a plane parallel to the tangent plane P. The angle between the line segment bc and the tangent plane P is $\phi$, and the angle between the line segment ab and the tangent plane P is $\theta$.

Here, when it is taken that the thrice-reflected light LR3 is emitted in a perpendicular direction from the reflecting surface C at the point c as shown in FIG. 20B, the twice-reflected light LR2 that is incident on the reflecting surface C is incident at the angle $\beta$ on the reflecting surface C shown in FIG. 20A. The angle $\gamma$ between the twice-reflected light LR2 and the tangent plane P is $\gamma+\beta=\phi$, and $\phi$ is about 54.7° as described with reference to FIG. 19. Accordingly, $\gamma$ is determined by $\gamma=2\times\phi-90° \approx 19.4°$. Because $\beta=\theta$, then $\beta \approx 35.3°$.

FIGS. 21A to 21C are for describing the difference between the dihedral corner reflector of the image-forming element of the embodiment and a well-known corner cube reflector.

FIGS. 21A to 21C show figures corresponding to the corner cube reflector CCR described with reference to FIGS. 19 and 20A. In FIGS. 21A to 21C, the points a, b, d, and e correspond to the points a, b, d, and e of the corner cube reflector CCR associated with FIGS. 19 and 20A. In FIGS. 21A to 21C, the points f, g, and h are added in addition to the points a, b, d, and e. The square having the points a, h, d, and b as vertices corresponds to the second reflecting surface 32 described with reference to FIGS. 4A and 4B. The square having the points a, b, e, and g as vertices corresponds to the first reflecting surface 31 described with reference to FIGS. 4A and 4B. The square having the points b, e, f, and d as vertices corresponds to the removed reflecting surface of the dihedral corner reflector 30, and corresponds to the reflecting surface C of the corner cube reflector CCR associated with FIGS. 19 and 20A.

In FIG. 21A, the square bdfe is shown by horizontal hatching. The triangles adb and abe are shown by vertical hatching. In FIG. 21B, the location corresponding to the square bdfe of FIG. 21A is illustrated by a thick solid line. That is, the square bdfe corresponds to the third reflecting surface of the corner cube reflector.

FIG. 21C shows a portion of FIG. 21B, a light ray, and reflected light of the light ray.

The case will now be considered in which the third reflecting surface exists in the square bdfe shown in FIGS. 21A and 21B.

As shown in FIG. 21C, when a light ray from the positive Z-axis side is incident on the square bdfe shown in FIGS. 21A and 21B, the incident light at the point f is reflected by the angle β with respect to the square bdfe. As described with reference to FIG. 20B, $\beta=\theta\approx35.3°$, and $\tan\beta=1/\sqrt{2}$. Accordingly, when the reflecting surface exists at the square bdfe, the reflected light is incident on one of the triangle adb or the triangle abe, which have vertical hatching. Then, the light is re-reflected by one of the reflecting surface corresponding to the square abeg or the reflecting surface corresponding to the square ahdb and emitted toward the positive Z-axis side. Thus, it can be said that the dihedral corner reflector of the image-forming element of the embodiment is different from the corner cube reflector.

As described above, the image-forming element of the embodiment can form a floating image at the first surface 11*a* side by the light ray emitted from the light source located at the first surface 11*a* side when referenced to the base member 12 being reflected twice by the dihedral corner reflector.

Effects of the image-forming element 10 of the embodiment will now be described.

In the image-forming element 10 of the embodiment, the angle of the dihedral corner reflector 30 with respect to the virtual plane P0 is set to be greater than 0° and less than 90°. Then, the angle of the dihedral corner reflector 30 with respect to the virtual plane P0 is set to be different according to the positions of the dihedral corner reflectors 30 arranged in the Y-axis direction, is set to increase away from the dihedral corner reflector 30 of the reference position in one direction of the Y-axis direction, and is set to decrease away from the dihedral corner reflector 30 of the reference position in the other direction of the Y-axis direction. By such a setting, a floating image can be formed at the first surface 11*a* side by twice-reflecting the light rays from the first surface 11*a* side when referenced to the base member 12.

In the image-forming element 10 of the embodiment, by appropriately setting the angles of the dihedral corner reflectors 30 with respect to the virtual plane P0, the light source can be located at any position at the first surface 11*a* side referenced to the base member 12, and the floating image can be formed at any desired position at the first surface 11*a* side that is different from the position of the light source.

As described in the first to fourth modifications, as long as the angles of the dihedral corner reflectors 30 with respect to the virtual plane P0 can be appropriately set, an image-forming element having an optimal shape can be realized by forming a reflector array of any shape at the base member. Therefore, a base member having any shape can be appropriately selected and applied according to the size of the image-forming element, the storage location, the storage method, etc., and it is easier to downscale, simplify the structure of the device, etc.

As described in the fifth modification, the shapes of the first and second reflecting surfaces when viewed in front-view are not limited to square, and an image-forming element in which the luminance of the floating image is increased can be realized using rectangles. Also, a floating image having a higher luminance can be obtained by optimally setting the ratio of the spacing of the reflector rows 22 and the area of the reflecting surface.

Second Embodiment

The image display device described below uses an image-forming element that utilizes the reversible reflections of the dihedral corner reflectors 30 as described with reference to FIG. 4D. In the following specific example, for example, the image display device forms a floating image according to the operation of the image-forming element described with reference to FIGS. 16 and 17. In the following specific example, a case is described where the image-forming element 310 of the third modification of the first embodiment described with reference to FIG. 9A is applied. Unless otherwise noted, the image-forming element 10 of the first embodiment and the image-forming elements 110, 210, 210*a*, and 310*a* of the other modifications are applicable to the image display device described below.

Figure 22:
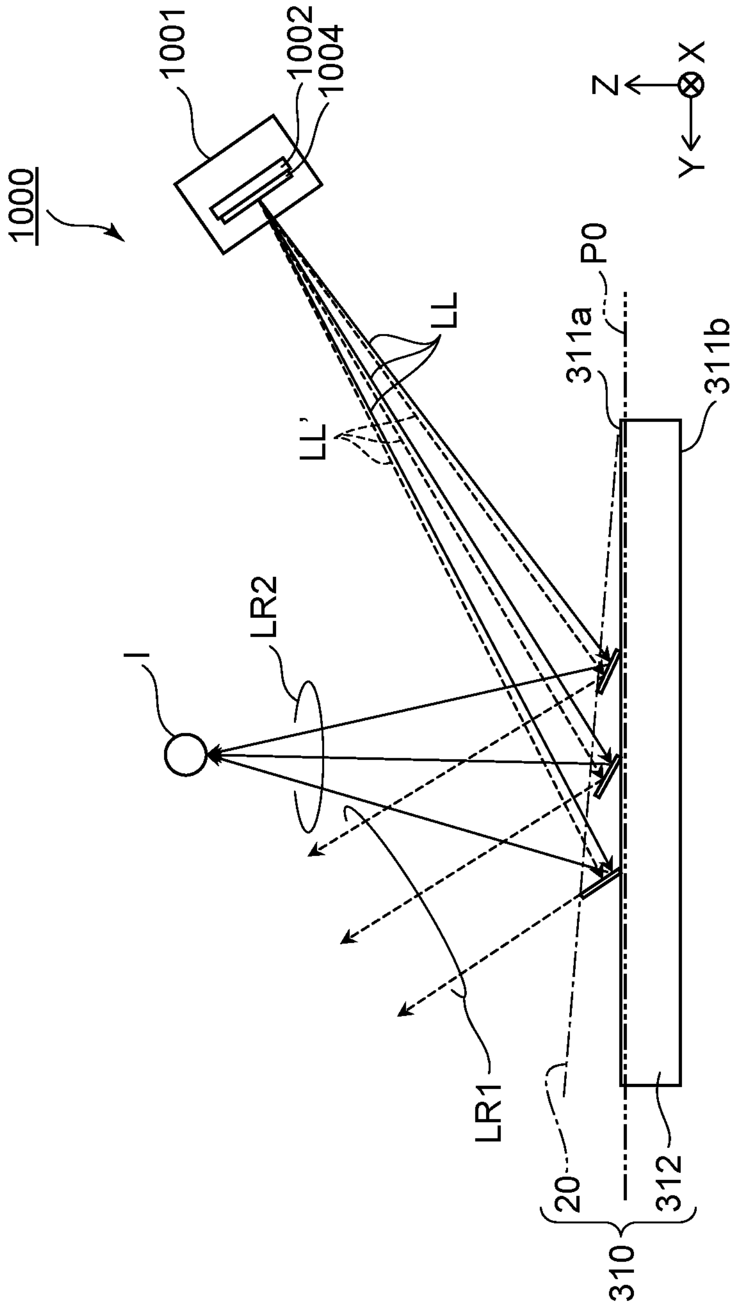
FIG. 22 is a schematic side view illustrating an image display device according to a second embodiment.

FIG. 22 is a schematic side view illustrating the image display device according to the embodiment.

As shown in FIG. 22, the image display device 1000 of the embodiment includes the image-forming element 310 and a display device 1001.

In FIG. 22, the image-forming element 310 includes the base member 312 and the reflector array 20. The reflector array 20 is located on the first surface 311*a* of the base member 312. The reflector array 20 is tilted with respect to the first surface 311*a*, and the tilt is set to gradually increase or decrease along the Y-axis as shown in FIG. 9A. In FIG. 22 and the drawings described below as well, the single dot-dash line illustrates the envelope connecting the vertices 33*a* of the dihedral corner reflectors 30 shown in FIG. 4B. The reflector array 20 of FIG. 22 has a simplified illustration of three dihedral corner reflectors 30 among many dihedral corner reflectors to show the reflection of the light rays incident on the reflector array 20.

In the example, the display device (a first display device) 1001 is provided as a light source. The display device 1001 displays an image (a first image) including a video image, a still image, etc. The display device 1001 can be various output devices that can display images. For example, the display device 1001 can be a display device with semiconductor light-emitting elements as pixels. The display device 1001 that includes semiconductor light-emitting elements includes a substrate 1002 and multiple semiconductor light-emitting elements 1004. The multiple semiconductor light-emitting elements 1004 are located on the substrate 1002. For example, the multiple semiconductor light-emitting elements 1004 are an array of micro LEDs formed of micro-size inorganic semiconductor light-emitting elements, or an array of micro OLEDs formed of organic semiconductor light-emitting elements. The display device 1001 may utilize a liquid crystal display panel, etc. A drive circuit, a control circuit, or the like that switch the semiconductor light-emitting elements 1004 on and control the display of the image are located, for example, inside the display device 1001. The drive circuit, the control circuit, etc., for the display device 1001 may be housed in a control device separate from the display device 1001. The image-forming element 310 includes an optical reflecting system and does not include a lens, and so color separation caused by chromatic aberration of the light emission wavelength does not occur. Therefore, the display device 1001 can be a color image display device that displays a clear color image.

The display device 1001 is located at the first surface 311*a* side. By using such a display device 1001 as the light source, the image display device 1000 can form a floating image in mid-air of the video image, still image, etc., displayed by the display device 1001. An observer that views the image of the image display device 1000 observes, from above the reflector array 20, the floating image I floating substantially directly above the reflector array 20.

Considering each semiconductor light-emitting element 1004 included in the display device 1001 as a point light source, the light that is emitted from one semiconductor light-emitting element 1004 is considered to include multiple light rays. FIG. 22 shows light rays emitted from one semiconductor light-emitting element 1004.

The display device 1001 is located at a position that is shifted toward the negative Y-axis side from directly above the reflector array 20. The light rays LL illustrated by the solid lines are portions of the light rays emitted from the display device 1001. These light rays LL are reflected by the two reflecting surfaces of the dihedral corner reflectors, and are emitted from the reflector array 20 as the twice-reflected light LR2.

The twice-reflected light LR2 that is emitted from the reflector array forms the floating image I directly above the reflector array 20. Directly above the reflector array 20 refers to a position in the normal direction of the virtual plane P0 and in the positive direction of the Z-axis. Light rays LL' illustrated by the broken lines are different from portions of the light rays emitted from the display device 1001. These light rays LL' are reflected by one reflecting surface of each of the dihedral corner reflectors 30, and are emitted from the reflector array 20 as the once-reflected light LR1. The once-reflected light LR1 that is emitted from the reflector array diverges without forming a floating image at the first surface 311*a* side.

The virtual plane P0 is a plane that is substantially parallel to the first surface 311*a*. When the base member 312 is formed of a light-transmitting material, the reflector array 20 may be located on the second surface 311*b* of the base member 312. In such a case, the second surface 311*b* of the base member 312 is substantially parallel to the virtual plane P0.

When the image-forming elements of the first embodiment or the other modifications are applied to the image display device of the embodiment, the virtual plane P0 is defined as described above with reference to FIG. 2.

Although not illustrated, the light rays that are emitted from the display device 1001 include light rays that are not reflected even once by the dihedral corner reflectors. When the base member 312 is light-transmissive, the light rays that are not reflected even once escape to the second surface 311*b* through the base part 36 and/or the spacing 23 of the reflector rows 22 shown in FIG. 1. When the base member of the modification described with reference to FIGS. 10A to 10C is applied to the image-forming element, the light rays that are not reflected even once are absorbed by the light-absorbing body located in the spacing 23 of the reflector rows 22.

Thus, in the image display device 1000 of the embodiment, there are cases where a false image is formed at a location other than directly above the reflector array 20, and the false image may become a ghost image if visible to the user of the image display device 1000. By appropriately setting the arrangement of the display device 1001 and the angles of the dihedral corner reflectors 30 included in the reflector array 20, the false image due to the once-reflected light can be formed at a position sufficiently separated from the formation position of the floating image I. When the image-forming element 310 is housed inside a housing, a black coating or the like can be provided on the interior wall of the housing to be light-absorbing so that the false image is not observed.

Modification

Figure 23:
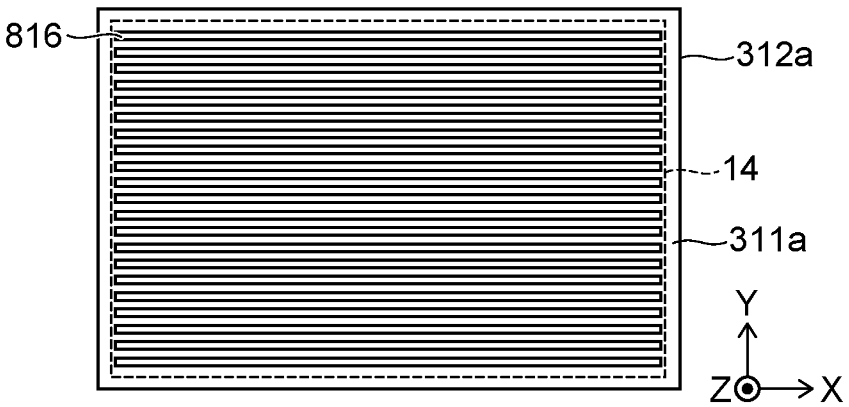
FIG. 23 is a schematic plan view illustrating a portion of an image display device according to a modification of the second embodiment.

FIG. 23 is a schematic plan view illustrating a portion of an image display device according to the modification.

FIG. 23 is a schematic plan view of a base member 312*a*. The base member 312*a* is applicable by replacing the base member 312 of the image display device 1000 shown in FIG. 22. The image-forming element in which the base member 312*a* is applied is applicable to the second and third modifications of the second embodiment described below.

The base member 312*a* includes light-reflecting bands 816 formed on the first surface 311*a*. The light-reflecting bands 816 are located in the regions between the reflector rows 22 shown in FIGS. 1 and 3. For example, the light-reflecting bands 816 can be thin films of the same metal material as the two reflecting surfaces included in the dihedral corner reflectors 30.

In the image display device 1000 of the second embodiment shown in FIG. 22, the light rays that are not reflected by the dihedral corner reflectors 30 even once are incident on the regions between the reflector rows 22. Even when the light-reflecting bands 816 reflect the light rays not reflected by the reflector array 20 even once, the reflected light is emitted in a direction different from the position of the floating image I due to the law of reflection, and does not affect the floating image I. Even for any of the configurations of the reflector array 20 described with reference to FIGS. 3A to 3C, the light rays that are not reflected by the dihedral corner reflectors 30 even once similarly do not affect the floating image I even when the spacing 23 and the base part 36 are light-reflective.

When the light-reflecting bands 816 are formed by forming the entire surface of the image-forming element 310 of a light-reflective material together with the two reflecting surfaces of the dihedral corner reflectors, the manufacturing processes of the image-forming element 310 can be simplified, and the productivity can be increased.

An operation of the image display device 1000 of the embodiment will now be described.

Figure 24A:
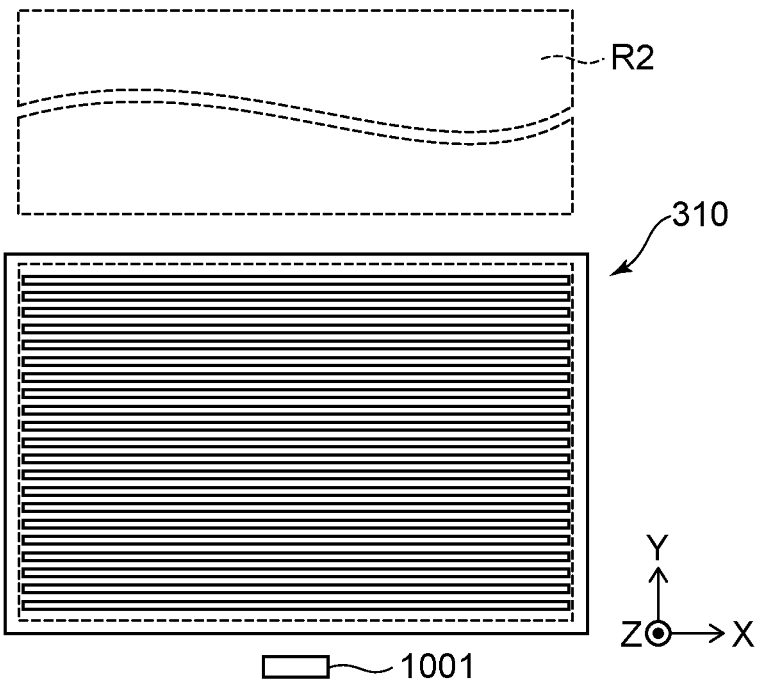
FIG. 24A is a schematic plan view for describing an operation of the image display device of the second embodiment.

FIG. 24A is a schematic plan view for describing the operation of the image display device of the embodiment.

Figure 24B:
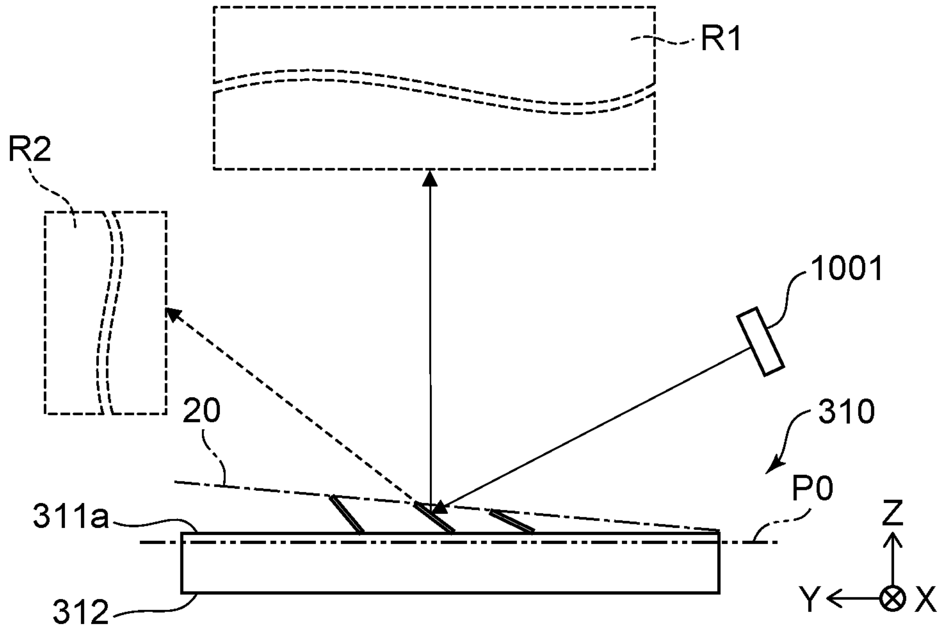
FIG. 24B is a schematic side view for describing an operation of the image display device of the second embodiment.

FIG. 24B is a schematic side view for describing the operation of the image display device of the embodiment.

In the image display device 1000 of the embodiment, the image-forming element 310 operates as described with reference to FIGS. 16 and 17 because the image-forming element 10 according to the first embodiment is used.

According to the embodiment, a portion of the light rays incident on the image-forming element 310 from the display device 1001 located at the first surface 311*a* side is reflected twice by the dihedral corner reflectors, is emitted toward the first surface 311*a* side, and forms a floating image. Another portion of the light rays incident on the image-forming element 310 is emitted as the once-reflected light of the dihedral corner reflectors, and may form a false image at a different position from the floating image formation position at the first surface 311*a* side.

As shown in FIGS. 24A and 24B, the light rays that are incident on the image-forming element 310 from the display device 1001 located at the first surface 311*a* side at a position shifted in the Y-axis direction from directly above the reflector array 20, when reflected twice by the dihedral corner reflectors, form a floating image in a region R1 directly above the reflector array 20 at the first surface 311*a* side. The Z-axis direction length and the Y-axis direction length of the region R1 are determined by adjusting or setting the angles of the dihedral corner reflectors with respect to the virtual plane P0 and the position of the display device 1001. The position of the display device 1001 can be positioned in the Y-axis direction to be sufficiently separated from the Y-axis direction position of the floating image formation position. The region R1 of the floating image can be a high position sufficiently separated from the reflector array 20 in the positive direction of the Z-axis, and can be a more proximate position.

Although the virtual plane P0 is substantially parallel to the first surface 311*a* in the example, as the first embodiment, when the first surface is a curved surface, the virtual plane P0 is taken as the tangent plane at the lowest position in the Z-axis direction of the portion of the circular arc of the first surface and the reflector array 20. In such a case, as in the first embodiment, the Z-axis direction lengths of the two Y-axis direction end portions of the image-forming element are set to be substantially equal. In such a case, the position of the virtual plane P0 is not limited to the position described above and may be arbitrary as long as the incident light rays are reflected twice by the dihedral corner reflectors and emitted toward the first surface side.

The reflected light that is emitted from the display device 1001 and once-reflected by the reflector array 20 may form a false image in a region R2 shifted in the Y-axis direction from the region R1 in which the floating image is formed at the first surface 311*a* side. In the example, the region R2 at which the false image due to the once-reflected light may be observed is set to be further toward the positive Y-axis side than the display device 1001 and the reflector array 20. The region R2 is determined by adjusting and/or setting the angles of the dihedral corner reflectors with respect to the virtual plane P0 and the position of the display device 1001. For example, there are also cases where the region R2 is further toward the display device 1001 side than the reflector array 20 at the first surface 311*a* side.

Effects of the image display device 1000 of the embodiment will now be described.

In a reflection-type image display device that uses an image-forming element using dihedral corner reflectors, it is difficult to form a floating image directly above the image-forming element (see, e.g., Patent Literature 1). It is therefore difficult for the formation position of the floating image and the position of the image-forming element to overlap when projected onto the XY-plane.

In an image display device that uses an image-forming element using corner cube reflectors, the corner cube reflectors are retroreflective elements as described with reference to FIG. 12A (see, e.g., Patent Literature 2). Therefore, contrivances are necessary to separate the position of the floating image and the position of the light source such as using an optical element such as a half mirror or the like, splitting the optical path, etc.; the structure of the device becomes complex, and there is a tendency for the device to be larger.

In the image display device 1000 of the embodiment, the dihedral corner reflectors are arranged so that a portion of the once-reflected light that is emitted from the light source and reflected once by one reflecting surface is reflected by another reflecting surface to be emitted as twice-reflected light. Therefore, when the display device 1001 is used as the light source as in the example, the image display device 1000 of the embodiment can display the video image and/or still image output by the display device 1001 in mid-air by using a simple structure.

In the image display device 1000 of the embodiment, the dihedral corner reflectors emit the twice-reflected light directly above the image-forming element 310 by appropriately setting the angles of the dihedral corner reflectors with respect to the virtual plane P0. Directly above the image-forming element 310 refers to the normal direction of the virtual plane P0 in the positive direction of the Z-axis.

For example, the display device 1001, which is the light source, is arranged to be shifted from directly above the image-forming element 310 in the Y-direction in which the reflector rows are arranged. By appropriately setting the angles of the dihedral corner reflectors 30, the image display device 1000 can form the floating image I directly above the image-forming element 310.

Thus, the image display device 1000 of the embodiment can form the floating image I directly above the reflector array 20. Therefore, as described in the third and fourth embodiments described below, an image display device that has high decorative quality and high designability can be easily configured.

In the display device 1001 used as the light source, for example, a gallium nitride compound semiconductor element including a light-emitting layer of $In_XAl_YGa_{1-X-Y}N$ ($0 \leq X$, $0 \leq Y$, and $X+Y<1$), etc., can be used as the semiconductor light-emitting element 1004. A high-contrast image can be displayed by patterning such a gallium nitride compound semiconductor element into micro LED elements formed on the substrate 1002. Therefore, the image display device 1000 of the embodiment can display a clearer image in mid-air.

As a specific example according to the embodiment, the base member 312 that is formed as a flat plate is utilized as the image-forming element 310; therefore, the image-forming element 310 can be thin, and the image display device 1000 can be compact. By applying the image-forming elements according to the first embodiment and the modifications of the first embodiment above to the image display device, image display devices that correspond to features of each image-forming element are possible.

Third Embodiment

Figure 25:
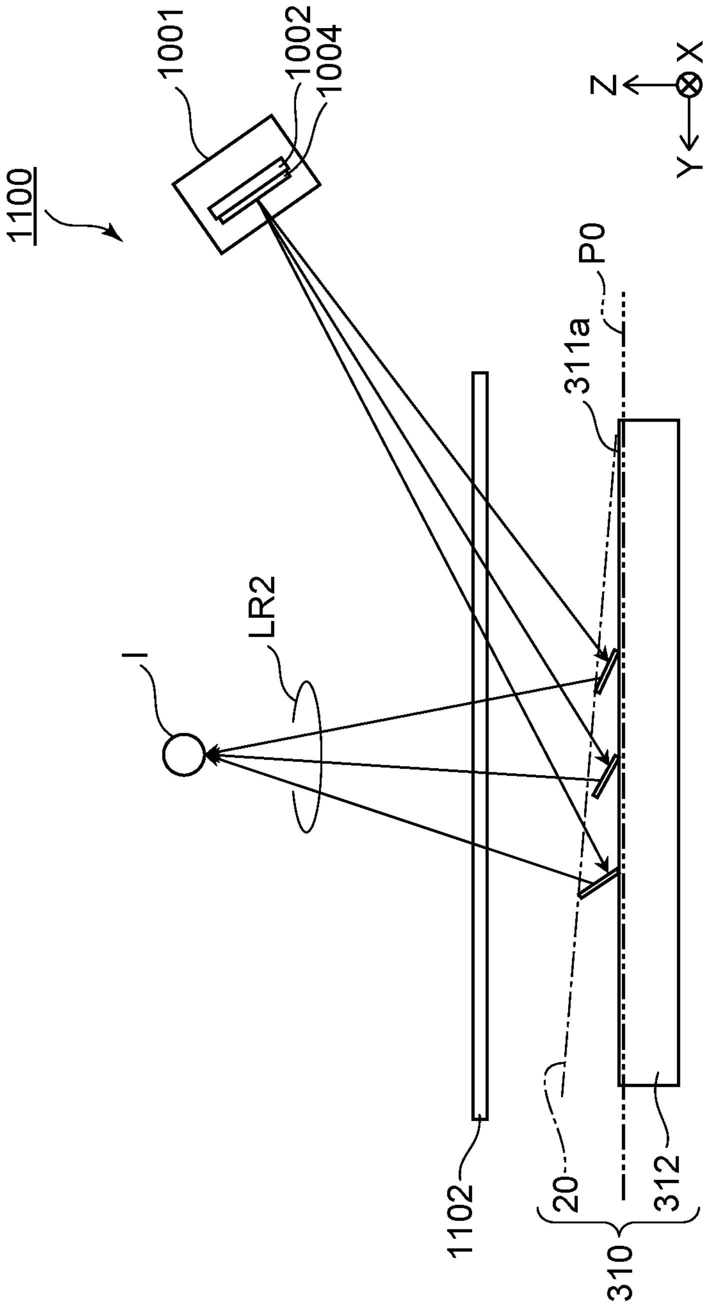
FIG. 25 is a schematic side view illustrating an image display device according to a third embodiment.

FIG. 25 is a schematic side view illustrating an image display device according to the embodiment.

The embodiment differs from the second embodiment above in that the image display device 1100 includes a decorative panel 1102. Otherwise, the embodiment is the same as the second embodiment; the same components are marked with the same reference numerals, and a detailed description is omitted.

As shown in FIG. 25, the image display device 1100 includes the display device 1001, the image-forming element 310, and the decorative panel 1102. The configurations of the display device 1001 and the image-forming element 310 are the same as those of the second embodiment, and a detailed description is omitted. As in the second embodiment, the image-forming element of the first embodiment and the image-forming elements of the modifications of the first embodiment are applicable.

The decorative panel 1102 is located at the first surface 311*a* side. The decorative panel 1102 is arranged to cover the image-forming element 310 at a prescribed distance from the image-forming element 310.

The light rays that are emitted from the display device 1001 are reflected twice by the dihedral corner reflectors 30 included in the reflector array 20, and are emitted from the reflector array 20 as the twice-reflected light LR2. The twice-reflected light LR2 that is emitted from the reflector array 20 forms the floating image I directly above the dihedral corner reflectors 30 via the decorative panel 1102. The decorative panel 1102 is located between the reflector array 20 and the floating image I. Although the decorative panel 1102 is located between the reflector array 20 and the display device 1001 in the example, it is sufficient for the display device 1001 to be capable of irradiating the light on the reflector array 20, and the display device 1001 may be positioned more proximate to the reflector array 20 than the decorative panel 1102 in the Z-axis direction. Or, the decorative panel 1102 may not be located between the reflector array 20 and the display device 1001.

The decorative panel 1102 is a frame-shaped panel member, and the frame part is decorated. The region that is surrounded with the frame part is light-transmissive with a low haze (Haze) value, and transmits the twice-reflected light from the reflector array 20. It is desirable for the haze (Haze) value to be low, e.g., not more than 20%, and more desirably not more than 5%. For example, the frame part of the decorative panel 1102 is provided with a wood-grain pattern of a surface at which the speedometer of the automobile is mounted. The display device 1001 displays an image of a speedometer so that the image is formed as a floating image via the decorative panel 1102, and when viewed by the user, appears as if the speedometer is located in a wood-grain instrument panel.

The decorative panel 1102 is formed of a material that is sufficiently light-transmissive so that the region that is surrounded with the frame part of the decorative panel 1102 can transmit the twice-reflected light.

The light-transmitting region of the decorative panel 1102 that is surrounded with the frame part may be provided with a pattern. For example, the region that is surrounded with the frame part can have a fixed display pattern. The fixed display pattern is, for example, a speedometer dial of an automobile, etc. Any pattern such as wood grain may be provided in the light-transmitting region surrounded with the frame part, and the image display device 1100 may display a video image of a speedometer, etc. In such a case, when the image display device 1100 does not display the mid-air image, the panel appears to be a wood-grain panel, and when the image display device 1100 displays the mid-air image, the speedometer can be displayed in front of the wood-grain panel. By using any pattern such as a speedometer dial, wood grain, or the like as the fixed display pattern of the decorative panel 1102, the image display device 1100 can provide a sufficient information amount to the user while using a small data capacity for the image display device 1100 to output the mid-air image.

Thus, by adding the decorative panel 1102, the information amount related to the display by the image display device 1100 as an entirety can be enlarged. Various decorative panels 1102 can be selected according to the application of the image display device 1100, so that high decorative quality and high designability can be expressed. In FIG. 25, the light rays that are emitted from the display device 1001 are drawn as reaching the reflector array 20 via the decorative panel 1102. When the frame part of the decorative panel 1102 is in the optical path of the light rays emitted from the display device 1001, the design at a corresponding location of the frame part is deleted as necessary to suppress a reduction of the amount of light reaching the reflector array 20 or interference due to the emitted light overlapping the design of the frame part. Or, the luminance of the mid-air display may be partially increased at the location at which the mid-air display is shielded by the decorative panel 1102. In such a case, an appropriate adaptation according to the shape, pattern, or the like of the decorative panel 1102 is performed, such as partially increasing the luminance of the light emitted from the display device 1001, etc.

Effects of the image display device 1100 of the embodiment will now be described.

In a reflection-type image display device using dihedral corner reflectors as the image-forming element, or in an image display device using corner cube reflectors as the image-forming element, components for the decorative effect must be additionally provided at different positions from the image-forming element to provide the decorative effect to the floating image. Therefore, the entire device is unavoidably larger.

In the image display device 1100 of the embodiment, the decorative panel 1102 is located at the first surface 311*a* side. As in the second embodiment above, the image-forming element 310 can form an image in mid-air directly above the image-forming element 310. The image that is formed in mid-air is formed via the light-transmitting region of the decorative panel 1102, and so the mid-air image appears, to the observer of the position at which the image is formed, to be formed at a region on the decorative panel 1102. Accordingly, an image display device having high decorative quality and high designability can be easily realized without making the structure of the device more complex or making the device larger.

Fourth Embodiment

Figure 26:
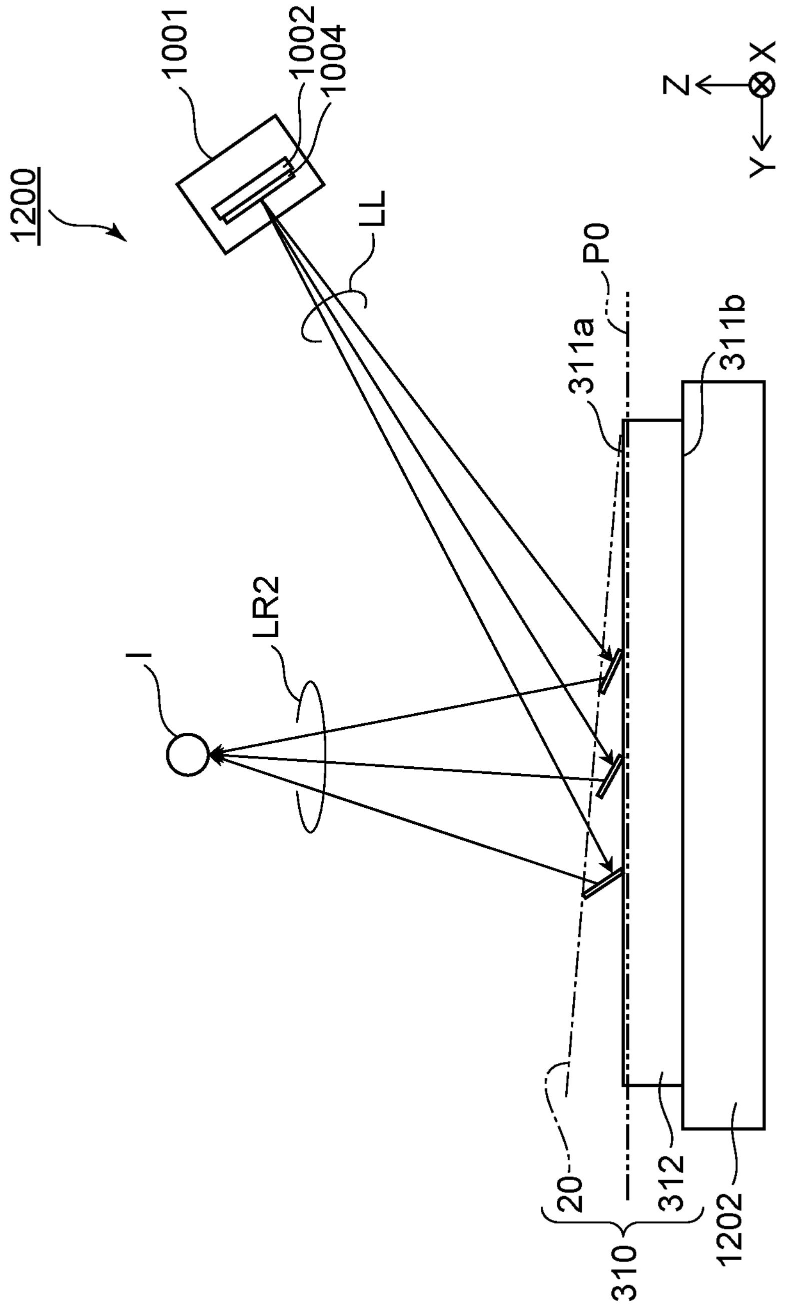
FIG. 26 is a schematic side view illustrating an image display device according to a fourth embodiment.

FIG. 26 is a schematic side view illustrating an image display device according to the embodiment.

The embodiment differs from the second embodiment above in that an image display device 1200 includes a display panel 1202. Otherwise, the embodiment is the same as the second embodiment; the same components are marked with the same reference numerals, and a detailed description is omitted.

As shown in FIG. 26, the image display device 1200 includes the display device 1001, the image-forming element 310, and the display panel (the second display device) 1202. The configurations of the display device 1001 and the image-forming element 310 are the same as those of the second embodiment, and a detailed description is omitted. As in the second embodiment, the image-forming element of the first embodiment and the image-forming elements of the modifications of the first embodiment are applicable.

The display panel 1202 is located at the second surface 311*b* side. The image-forming element 310 is located on the display panel 1202. In the example, the image-forming element 310 uses a flat-plate base member 312, and so the flat-plate display panel 1202 is closely adhered to the second surface 311*b*. When a base member in which the image-forming element has a curved surface such as that of the first embodiment is used, for example, the display panel is pre-curved to form a portion of a circular arc that is convex in the negative direction of the Z-axis when projected onto the YZ-plane. The display panel 1202 may be formed of a flexible material, in which case the display panel is closely adhered to the mounting surface of the image-forming element while being curved.

Although not illustrated, in addition to a panel that displays an image, the display panel 1202 includes a control circuit, drive circuit, etc., for controlling the display of the video image and/or still image by the panel. For example, the control circuit, drive circuit, etc., are located further toward the negative Z-axis side than the display panel 1202. The display panel 1202 displays the video image and/or still image in the positive direction of the Z-axis according to the operations of the control circuit, drive circuit, etc. The drive circuit, control circuit, etc., for the display panel 1202 may be housed inside a control device in a housing separate from the display panel 1202.

The video image and/or still image that is displayed by the display panel 1202 is displayed independently of the image displayed by the display device 1001. Or, the video image and/or still image that is displayed by the display panel 1202 is displayed conjunctively with the image displayed by the display device 1001. For example, the video image and/or still image that is displayed by the display panel 1202 is displayed as a background of the floating image of the image displayed by the display device 1001. Specifically, the image that is displayed by the display panel 1202 is, for example, an image of a game, animation character, etc.

The modifications according to the embodiment can be appropriately combined. For example, the decorative panel 1102 according to the third embodiment may be arranged to display both the image displayed by the display panel 1202 and the image displayed in mid-air by the display device 1001 according to the embodiment.

Effects of the image display device 1200 of the embodiment will now be described.

The image display device 1200 of the embodiment includes the display panel 1202 at the back surface of the image-forming element 310. By including the display panel 1202 at the back surface of the image-forming element 310, the image display device 1200 can use the image-forming element 310 to display the image in mid-air to overlap the video image and/or still image displayed by the display panel 1202. Therefore, because the user can view a large amount of information, the image display device 1200 can realize high decorative quality and high designability, and can function as an advanced information processing terminal.

According to the embodiments above, an image display device having a simple structure that can display an image in mid-air can be realized.

Although several embodiments of the invention are described hereinabove, these embodiments have been presented by way of example only, and are not intended to limit the scope of the inventions. These novel embodiments may be embodied in a variety of other forms, and various omissions, substitutions, and changes may be made without departing from the spirit of the inventions. Such embodiments and their modifications are within the scope and spirit of the inventions, and are within the scope of the inventions described in the claims and their equivalents. Also, the embodiments above can be implemented in combination with each other.

What is claimed is:

1. An image display device comprising:

an image-forming element; and a light source configured to irradiate light on the image-forming element, wherein:

the image-forming element comprises:

a base member including a first surface and a second surface, the second surface being positioned at a side opposite to the first surface, and a reflector array located on the base member, the reflector array including a plurality of reflector rows, each of the plurality of reflector rows comprises a plurality of dihedral corner reflectors arranged along a first direction, each of the plurality of dihedral corner reflectors includes:

a first reflecting surface configured to reflect light from a first surface side, and a second reflecting surface orthogonal to the first reflecting surface, and configured to reflect a reflected light from the first reflecting surface toward the first surface side, in each of the plurality of reflector rows, an angle between a straight line and a virtual plane is greater than 0° and less than 90°, the first reflecting surface and the second reflecting surface crossing at the straight line, the virtual plane including the first direction and a second direction crossing the first direction, an angle between the first reflecting surface and the virtual plane is greater than 45° and less than 90°, the plurality of reflector rows include a first reflector row of which the angle between the straight line and the virtual plane is set to a smallest value among the plurality of reflector rows, reflector rows other than the first reflector row are configured such that the angle between the straight line and the virtual plane is set to values that increase away from the first reflector row in the second direction, the light source is located at the first surface side, each of the plurality of dihedral corner reflectors is arranged so that a portion of a once-reflected light travels toward the second reflecting surface, the once-reflected light being light that is emitted from the light source and reflected by the first reflecting surface.

2. The image display device according to claim 1, wherein:

each of the plurality of dihedral corner reflectors is configured so that the portion of the once-reflected light is reflected by the second reflecting surface to travel in a third direction orthogonal to the first and second directions.

3. The image display device according to claim 1, further comprising:

a decorative panel covering the reflector array, the decorative panel being light-transmissive, wherein:

a twice-reflected light reflected by the second reflecting surface is emitted from the reflector array via the decorative panel.

4. The image display device according to claim 1, wherein:

the light source is a first display device configured to display a first image, and the first display device comprises a substrate, and a plurality of semiconductor light-emitting elements located on the substrate.

5. The image display device according to claim 1, wherein:

the base member comprises a material that is light-transmissive.

6. The image display device according to claim 1, wherein:

in the base member, the first surface is a plane parallel to the virtual plane, and the reflector array is located on the first surface.

7. The image display device according to claim 1, wherein:

the base member is light-transmissive, in the base member, the second surface extending in a plane parallel to the virtual plane, and the reflector array is located on the second surface.

8. The image display device according to claim 1, wherein:

in the base member, the first surface is convex toward the second surface side in a plan view of a plane including the second direction and a third direction is, the third direction is orthogonal to the first and second directions, the reflector array is located on the first surface, and an angle of a corner between the straight line and the first surface is set to equal values for each of the plurality of reflector rows.

9. The image display device according to claim 1, wherein the base member is light-transmissive, the second surface is convex from the first surface side when a plane including the second direction and a third direction is viewed in plan, the third direction is orthogonal to the first and second directions, the reflector array is located on the second surface, and an angle of a corner between the straight line and the second surface is set to equal values for each of the plurality of reflector rows.

10. The image display device according to claim 1, further comprising:

a protective layer covering the reflector array.

11. The image display device according to claim 1, comprising:

a light-reflective member between adjacent ones of the reflector rows.

12. The image display device according to claim 1, comprising:

a light-absorbing member between adjacent ones of the reflector rows.

13. The image display device according to claim 1, further comprising:

a second display device configured to display a second image, wherein:

the base member is light-transmissive, and the image-forming element is located on the second display device.

* * * * *